US007690571B2

(12) United States Patent
Mattern

(10) Patent No.: US 7,690,571 B2
(45) Date of Patent: Apr. 6, 2010

(54) ITEM HANDLING SYSTEM AND METHOD

(75) Inventor: James Michael Mattern, Bethany, CT (US)

(73) Assignee: Neopost Technologies, Bagneux (FR)

( * ) Notice: Subject to any disclaimer, the term of this patent is extended or adjusted under 35 U.S.C. 154(b) by 233 days.

(21) Appl. No.: 10/529,272

(22) PCT Filed: Sep. 26, 2003

(86) PCT No.: PCT/EP03/10731

§ 371 (c)(1),
(2), (4) Date: Oct. 5, 2005

(87) PCT Pub. No.: WO2004/029882

PCT Pub. Date: Apr. 8, 2004

(65) Prior Publication Data

US 2006/0108410 A1 May 25, 2006

(51) Int. Cl.
*G06K 7/10* (2006.01)

(52) U.S. Cl. .................................. 235/462.01; 705/406

(58) Field of Classification Search ............ 235/462.01; 705/406; 340/572.8
See application file for complete search history.

(56) References Cited

U.S. PATENT DOCUMENTS 4,445,635 A * 5/1984 Barr ........................... 229/302
4,757,537 A * 7/1988 Edelmann et al. ............. 380/51
4,797,937 A * 1/1989 Tajima ........................ 382/101
5,495,981 A * 3/1996 Warther ........................ 229/71
5,898,153 A * 4/1999 Lagan et al. ................ 235/375
6,108,643 A * 8/2000 Sansone ....................... 705/62
6,259,369 B1 * 7/2001 Monico ................... 340/572.8
6,375,080 B1 * 4/2002 Cremonese ................. 235/487
6,427,139 B1 * 7/2002 Pierce ......................... 705/60
6,487,301 B1 * 11/2002 Zhao .......................... 382/100
2002/0087493 A1 * 7/2002 Herbert ...................... 705/406
2003/0089765 A1 * 5/2003 Kovlakas .................... 235/375
2004/0050919 A1 * 3/2004 Calonje et al. .............. 229/306

FOREIGN PATENT DOCUMENTS

GB 2 174 039 10/1986

* cited by examiner

*Primary Examiner*—Kumiko C Koyama
(74) *Attorney, Agent, or Firm*—Townsend and Townsend and Crew LLP

(57) ABSTRACT

An item handling system for and method of handling items in an item stream, the system comprising: a validation unit for validating an element containing an authentication code on each item in an item stream, wherein an item is assigned as being spoiled where the element does not satisfy at least one validation criterion; and a sorting unit for separating spoiled items from the item stream.

53 Claims, 22 Drawing Sheets

ITEM HANDLING SYSTEM AND METHOD

This application is a national phase of International Application No. PCT/EP2003/010731 filed Sep. 26, 2003 and published in the English language.

FIELD OF THE INVENTION

The present invention relates to an item handling system for and method of handling items, especially mail documents, such as sheets, and mail carriers, such as envelopes, and in particular an item handling system for and method of refunding or reusing value as applied to spoiled items, especially postage value as applied to spoiled mail documents bearing sensitive information.

BACKGROUND OF THE INVENTION

Where items, typically mail documents, such as sheets, or mail carriers, such as envelopes, as printed in large batches or runs, are to be delivered by a postage service, the required postage value can either be applied on the mail carriers or directly to the mail documents. The direct application of postage value to mail documents facilitates the subsequent handling of the mail documents in not requiring the postage value subsequently to be applied separately to the mail carriers. Typically, postage value can be applied by way of an imprinted indicium incorporating an authentication code, which indicium, where applied directly to a mail document, is provided at a window of a windowed envelope, or an electronic label, such as a radio frequency (RF) tag, incorporating an authentication code.

The application of postage value can, however, lead to spoilage where mail documents or mail carriers are not properly imprinted or electronically labelled, for example, as a result of mis-registration of the printer or label writer or improper operation of the printer or label writer.

Where handling large batches of items, the numbers of spoiled items can be quite significant. Ordinarily, a batch of items including any spoiled items would be delivered to the postage service, with spoiled items being returned in due course, and thereby necessitating the manual handling of each of the spoiled items in order to request a refund of the postage value associated with each spoiled item. Where an item is spoiled, the item is currently required to be presented to the postage service for a refund of the applied postage value.

As will be appreciated, the requesting of refunds in respect of spoiled items is particularly laborious, and often refunds are not requested as the effort required to obtain the refunds does not merit the value of the refunds.

Also, as the present inventor has recognized, where the items include sensitive information, typically confidential, personal information, such as medical or financial information, the sensitive information should not be made available to a third party.

It is thus an aim of the present invention to provide an item handling system for and method of handling items, especially mail documents, such as sheets, and mail carriers, such as envelopes, which allow for identification of spoiled items, and in particular an item handling system for and method of refunding or reusing value as applied to spoiled items, especially postage value as applied to spoiled mail documents bearing sensitive information.

SUMMARY OF THE INVENTION

In one aspect the present invention provides an item handling system for handling items in an item stream, the system comprising: a validation unit for validating an element containing an authentication code on each item in an item stream, wherein an item is assigned as being spoiled where the element does not satisfy at least one validation criterion; and a sorting unit for separating spoiled items from the item stream.

In one embodiment the validation unit is operative to scan each item for an element.

Preferably, the at least one validation criterion requires the element to have at least one physical characteristic.

More preferably, the at least one physical characteristic comprises at least one of a position, size and color of the element.

In one embodiment the validation unit is operative to read data from the element.

Preferably, the at least one validation criterion requires authentication of at least part of the read data.

In one embodiment the authentication of at least part of the read data requires the at least part of the read data to have a predeterminable format.

In another embodiment the authentication of at least part of the read data requires the at least part of the read data to match check data.

In one embodiment the element is a printed imprint.

Preferably, the imprint is a two-dimensional barcode.

In another embodiment the element is an electronic label.

Preferably, the electronic label is a radio frequency tag.

In one embodiment the items bear sensitive information.

In one embodiment the sensitive information is printed on the items.

In another embodiment the items include an electronic label containing the sensitive information.

Preferably, the electronic label is a radio frequency tag.

In one embodiment the system further comprises: a perforating unit for perforating each spoiled item about the element such as to allow a section of the item including the element and excluding the sensitive information to be separated.

In another embodiment each item is perforated about a section including the element, such as to allow the section of the item including the element and excluding the sensitive information to be separated.

In a further embodiment the element is removable from the item such as to allow the element to be separated.

In yet another embodiment each item includes a label on which the element is provided, such as to allow the element to be separated by removal of the label.

In one embodiment the sensitive information is encoded.

In a yet further embodiment the system further comprises: an obliteration unit for obliterating the sensitive information on each spoiled item.

In one embodiment the obliteration unit comprises a printer for over-printing the sensitive information such as to render the sensitive information unreadable.

In another embodiment the obliteration unit comprises an applicator for applying a panel over the sensitive information such as to render the sensitive information unreadable.

In a further embodiment the obliteration unit comprises a cutter for cutting out a section of each spoiled item including the sensitive information such that the item includes no sensitive information.

In a still further embodiment the system further comprises: a packaging unit for packaging each spoiled item such as to conceal the sensitive information.

In a yet further embodiment each item includes a cover sheet on which the element is provided, such as to allow the cover sheet including the element to be separated from the item.

In one embodiment the cover sheet includes no sensitive information.

Preferably, the system further comprises: a control unit for controlling operation of the system.

In still yet another embodiment the control unit is operative to generate a spoiled item notification in respect of each spoiled item for communication to a remote center.

Preferably, the control unit includes a communications module for electronically communicating with the remote center, whereby the spoiled item notifications are transmitted electronically to the remote center.

In one embodiment each spoiled item notification is transmitted separately.

In another embodiment the spoiled item notifications are transmitted in batches at predeterminable intervals.

Preferably, the validation unit is operative to acquire an image of each spoiled element, and each spoiled item notification includes an image of the respective spoiled element.

In one embodiment the image excludes the sensitive information.

In one embodiment the authentication code embodies value.

In a still yet further embodiment the control unit includes a refund credit register and is operative to credit the refund credit register in respect of the value as applied to each spoiled item.

In still yet another further embodiment the control unit is operative to provide for reuse of the authentication code contained in the element of each spoiled item.

Preferably, the system further comprises: a writing unit for writing an element on each item; and wherein the control unit is operative to control the writing unit to write an element containing the authentication code contained in the element of a previous item assigned as being spoiled.

In one embodiment the writing unit comprises a printing unit for printing an imprint as an element on each item.

In another embodiment the writing unit comprises an electronic label writer for writing to an electronic label as an element on each item.

In one embodiment the items comprise documents.

Preferably, the documents comprise one or more sheets.

Preferably, the documents comprise mail documents.

In another embodiment the items comprise document carriers.

Preferably, the document carriers comprise envelopes.

Preferably, the document carriers comprise mall carriers.

In another aspect the present invention provides a method of handling items in an item stream, the method comprising the steps of: validating an element containing an authentication code on each item in an item stream, wherein an item is assigned as being spoiled where the element does not satisfy at least one validation criterion; and separating spoiled items from the item stream.

In one embodiment each item is scanned for an element in the validation step.

Preferably, the at least one validation criterion requires the element to have at least one physical characteristic.

More preferably, the at least one physical characteristic comprises at least one of a position, size and color of the element.

In one embodiment data is read from each element in the validation step.

Preferably, the at least one validation criterion requires authentication of at least part of the read data.

In one embodiment the authentication of at least part of the read data requires the at least part of the read data to have a predeterminable format.

In another embodiment the authentication of at least part of the read data requires the at least part of the read data to match check data.

In one embodiment the element is a printed imprint.

Preferably, the imprint is a two-dimensional barcode.

In another embodiment the element is an electronic label.

Preferably, the electronic label is a radio frequency tag.

In one embodiment the items bear sensitive information.

In one embodiment the sensitive information is printed on the items.

In another embodiment the items include an electronic label containing the sensitive information.

Preferably, the electronic label is a radio frequency tag.

In one embodiment the method further comprises the step of: perforating each spoiled item about the element such as to allow a section of the item including the element and excluding the sensitive information to be separated.

In another embodiment each item is perforated about a section including the element, such as to allow the section of the item including the element and excluding the sensitive information to be separated.

In a further embodiment the element is removable from the item such as to allow the element to be separated.

In yet another embodiment each item includes a label on which the element is provided, such as to allow the element to be separated by removal of the label.

In one embodiment the sensitive information is encoded.

In a yet further embodiment the method further comprises the step of: obliterating the sensitive information on each spoiled item.

In one embodiment the obliterating step comprises the step of: over-printing the sensitive information such as to render the sensitive information unreadable.

In another embodiment the obliterating step comprises the step of: applying a panel over the sensitive information such as to render the sensitive information unreadable.

In a further embodiment the obliterating step comprises the step of: cutting out a section of each spoiled item including the sensitive information such that the item includes no sensitive information.

In a still further embodiment the method further comprises the step of: packaging each spoiled item such as to conceal the sensitive information.

In a yet further embodiment each item includes a cover sheet on which the element is provided, such as to allow the cover sheet including the element to be separated from the item.

In one embodiment the cover sheet includes no sensitive information.

In still yet another embodiment the method further comprises the step of: generating a spoiled item notification in respect of each spoiled item for communication to a remote center.

Preferably, the method further comprises the step of: electronically transmitting the spoiled item notifications to the remote center.

In one embodiment each spoiled item notification is transmitted separately.

In another embodiment the spoiled item notifications are transmitted in batches at predeterminable intervals.

Preferably, an image of each spoiled element is acquired in the validation step, and each spoiled item notification includes an image of the respective spoiled element.

In one embodiment the image excludes the sensitive information.

In one embodiment the authentication code embodies value.

In a still yet further embodiment the method further comprises the step of: crediting a refund credit register in respect of the value as applied to each spoiled item.

In still yet another further embodiment the method further comprises the step of: reusing the authentication code contained in the element of each spoiled item.

Preferably, the method further comprises the step of: writing an element on each item, wherein, where the element of a previous item is assigned as being spoiled, the written element contains the authentication code contained in the element of the previous item assigned as being spoiled.

In one embodiment the writing step comprises the step of: printing an imprint as an element on each item.

In another embodiment the writing step comprises the step of: electronically writing to an electronic label as an element on each item.

In one embodiment the items comprise documents.

Preferably, the documents comprise one or more sheets.

Preferably, the documents comprise mail documents.

In another embodiment the items comprise document carriers.

Preferably, the document carriers comprise envelopes.

Preferably, the document carriers comprise mail carriers.

In its preferred embodiment the present invention relates to a mail preparation system for and method of preparing mail items for delivery to a postage service. In validating the mail items prior to delivery to a postage service, the present invention provides that all of the delivered mail items are valid items, and facilitates the obtainance of a refund in respect of spoiled items.

In a further aspect the present invention provides an item handling system for handling spoiled items including an element containing an authentication code and bearing sensitive information, the system including: a perforating unit for perforating each spoiled item about the element such as to allow a section of the item including the element and excluding the sensitive information to be separated.

In yet another aspect the present invention provides an item handling system for handling spoiled items including an element containing an authentication code and bearing sensitive information, the system including: an obliteration unit for obliterating the sensitive information on each spoiled item.

In one embodiment the obliteration unit comprises a printer for over-printing the sensitive information such as to render the sensitive information unreadable.

In another embodiment the obliteration unit comprises an applicator for applying a panel over the sensitive information such as to render the sensitive information unreadable.

In a further embodiment the obliteration unit comprises a cutter for cutting out a section of each spoiled item including the sensitive information such that the item includes no sensitive information.

In a yet further aspect the present invention provides an item handling system for handling spoiled items including an element containing an authentication code and bearing sensitive information, the system including: a packaging unit for packaging each spoiled item such as to conceal the sensitive information.

In a still further aspect the present invention provides an item handling system for handling spoiled items including an element containing an authentication code and bearing sensitive information, the system including: a cover sheet application unit for applying a cover sheet to each item on which an element is provided, such as to allow the cover sheet including the element to be separated from each spoiled item.

In a yet further aspect the present invention provides an item handling system for handling spoiled items including an element containing an authentication code and bearing sensitive information, the system including: a control unit for controlling operation of the system and including a communications module for electronically communicating with a remote center, wherein the control unit is operative to generate a spoiled item notification in respect of each spoiled item and transmit the spoiled item notifications electronically to the remote center.

In still yet another aspect the present invention provides an item handling system for handling spoiled items including an element containing an authentication code embodying value and bearing sensitive information, the system including: a control unit for controlling operation of the system and including a refund credit register, wherein the control unit is operative to credit the refund credit register in respect of the value as applied to each spoiled item.

In a still yet further aspect the present invention provides an item handling system for handling spoiled items including an element containing an authentication code embodying value and bearing sensitive information, the system including: a control unit for controlling operation of the system, wherein the control unit is operative to provide for reuse of the authentication code contained in the element of each spoiled item.

In still yet another aspect the present invention provides a document including an element containing an authentication code and bearing sensitive information, wherein the document is perforated about a section including the element, such as to allow the section of the document including the element and excluding the sensitive information to be separated.

In one embodiment the document comprises one or more sheets.

In a still yet further aspect the present invention provides a document including an element containing an authentication code and bearing sensitive information, wherein the element is attached to the document such as to allow for complete removal therefrom.

In one embodiment the document comprises one or more sheets.

In still yet another further aspect the present invention provides a document including an element containing an authentication code and bearing sensitive information, wherein the document includes a removable label on which the element is provided, wherein the label is attached to the document such as to allow for complete removal thereof.

In one embodiment the document comprises one or more sheets.

BRIEF DESCRIPTION OF THE DRAWINGS

Preferred embodiments of the present invention will now be described hereinbelow by way of example only with reference to the accompanying drawings, in which.

DETAILED DESCRIPTION OF THE PREFERRED EMBODIMENTS

Figure 1:
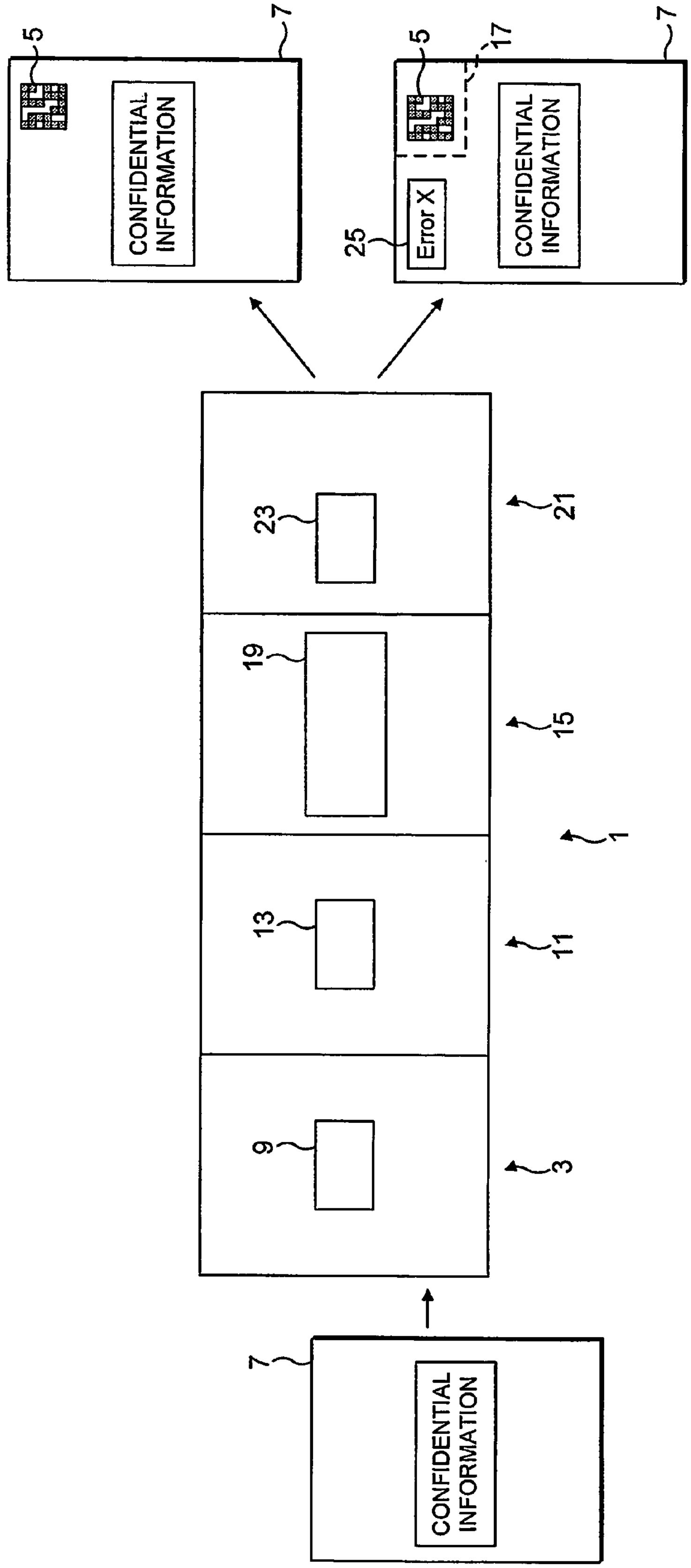
FIG. 1 illustrates an item handling system in accordance with a first embodiment of the present invention.

FIG. 1 illustrates an item handling system 1 in accordance with a first embodiment of the present invention.

The item handling system 1 comprises a printing unit 3 for printing a postage imprint 5 on each item 7 as delivered thereto. In this embodiment the item 7 comprises a mail document, such as one or more sheets, for example, letter or information sheets, but in other embodiments could be a mail carrier, such as an envelope. In this embodiment the item 7 bears sensitive information, such as confidential, personal information.

The printing unit 3 includes a printer 9, in this embodiment having an addressable head, for printing a postage imprint 5, in this embodiment as a two-dimensional barcode indicium, alternatively referred to as a data matrix, embodying postage value on an item 7.

The item handling system 1 further comprises a validation unit 11 for validating the imprint 5 as applied to each item 7.

The validation unit 11 includes an imaging apparatus 13, in this embodiment utilizing a camera, for scanning each item 7 to determine the position and shape of the footprint of the applied imprint 5, and acquiring an image of the imprint 5 so as to read the data thereof.

Figure 2:
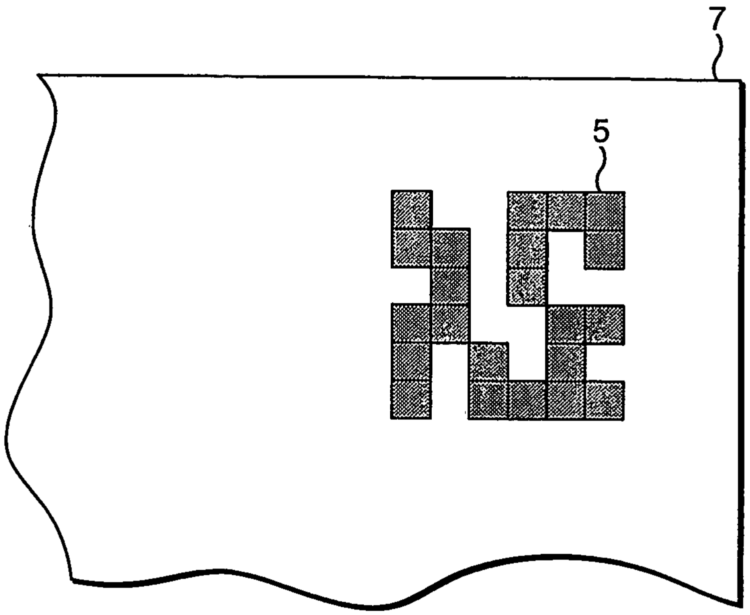
FIG. 2 illustrates an imprint as properly printed on an item in accordance with the first embodiment of the present invention.
Figure 3:
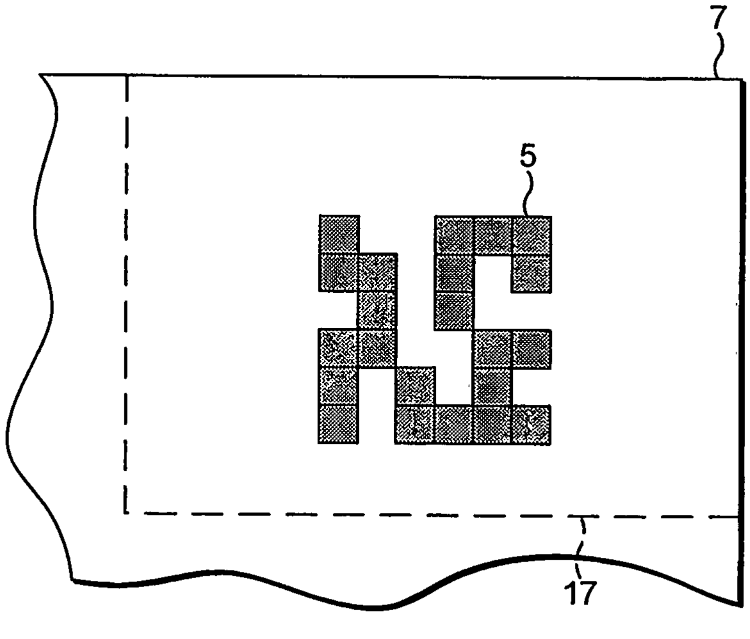
FIG. 3 illustrates an imprint as improperly printed on an item in accordance with the first embodiment of the present invention.

In this embodiment the validation unit 11 is operative to reference the position and shape of the footprint of the scanned imprint 5 to an expected position and shape. Where one or both of the position and shape of the imprint 5 is not as expected, the imprint 5, and hence the associated item 7, is assigned as being spoiled. In one embodiment the color of the imprint 5 could also be referenced. FIG. 2 illustrates a good imprint 5, in having a footprint which is of a predetermined size and located within a predetermined window. FIG. 3 illustrates an example of a spoiled imprint 5, in having a footprint which extends outside a predetermined window, typically as caused by mis-registration of the item 7 and the printer 9 of the printing unit 3.

In this embodiment the validation unit 11 is operative to authenticate the obtained data by referencing the obtained data with the print data as utilized by the printing unit 3 to print the imprint 5. Where the obtained data and the print data do not reference, the imprint 5, and hence the associated item 7, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 1 further comprises a perforating unit 15 for perforating each item 7 assigned as being spoiled to introduce a perforation 17 about the spoiled imprint 5, thereby providing for ready detachment of the spoiled imprint 5 from the main body of the item 7, which in this embodiment includes the sensitive information, and allowing for presentation of the detached spoiled imprint 5 to the postage service for a refund of the applied postage value.

The perforating unit 15 includes a perforator 19 for perforating each spoiled item 7 with a perforation 17, in this embodiment as a line, having a predetermined position.

The item handling system 1 further comprises a sorting unit 21 for removing the spoiled items 7 from the item stream, thereby providing for continued operation of the item handling system 1 without having to interrupt the item stream to retrieve the spoiled items 7.

In this embodiment the sorting unit 21 includes a printer 23 for printing spoilage information 25, which designates the reason for spoilage, such as through the use of an error code, on each item 7. As will be appreciated, identifying the reason for spoilage facilitates the processing of spoiled items 7 by the postage service.

In one embodiment the item handling system 1 can be configured such as to cease operation where a predetermined number of spoiled imprints 5 are printed for a given number of printed imprints 5. For example, where X spoiled imprints 5 are printed for Y printed imprints 5, or Z spoiled imprints 5 are printed consecutively.

In one alternative embodiment the perforating unit 15 can be omitted and the items 7 instead be pre-perforated.

Figure 4:
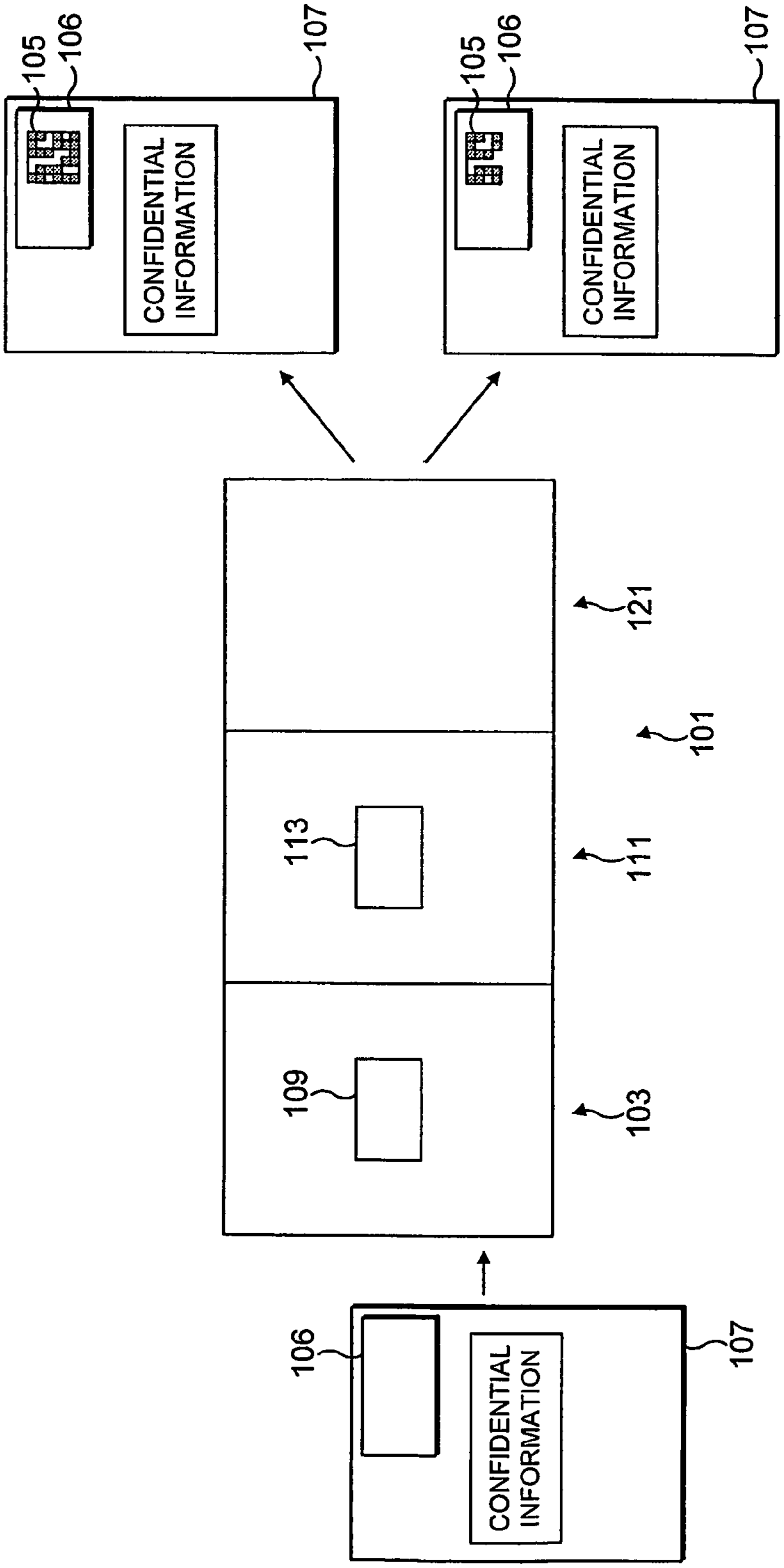
FIG. 4 illustrates an item handling system in accordance with a second embodiment of the present invention.

FIG. 4 illustrates an item handling system 101 in accordance with a second embodiment of the present invention.

The item handling system 101 comprises a printing unit 103 for printing a postage imprint 105 on a label 106 as affixed to each item 107. In this embodiment the item 107 comprises a mail document, such as one or more sheets, for example, letter or information sheets. In this embodiment the item 107 bears sensitive information, such as confidential, personal information.

In this embodiment the label 106 is pre-applied to the item 107 such as to allow for direct printing thereon, and is removable such as to allow for presentation of a postage imprint 105, where spoiled, to the postage service separately from the item 107.

The printing unit 103 includes a printer 109, in this embodiment having an addressable head, for printing a postage imprint 105, in this embodiment as a two-dimensional barcode indicium, alternatively referred to as a data matrix, embodying postage value on the label 106 on each item 107.

The item handling system 101 further comprises a validation unit 111 for validating the imprint 105 as applied to each item 107.

The validation unit 111 includes an imaging apparatus 113, in this embodiment utilizing a camera, for scanning each item 107 to determine the position and shape of the footprint of the applied imprint 105, and acquiring an image of the imprint 105 so as to read the data thereof.

Figure 5:
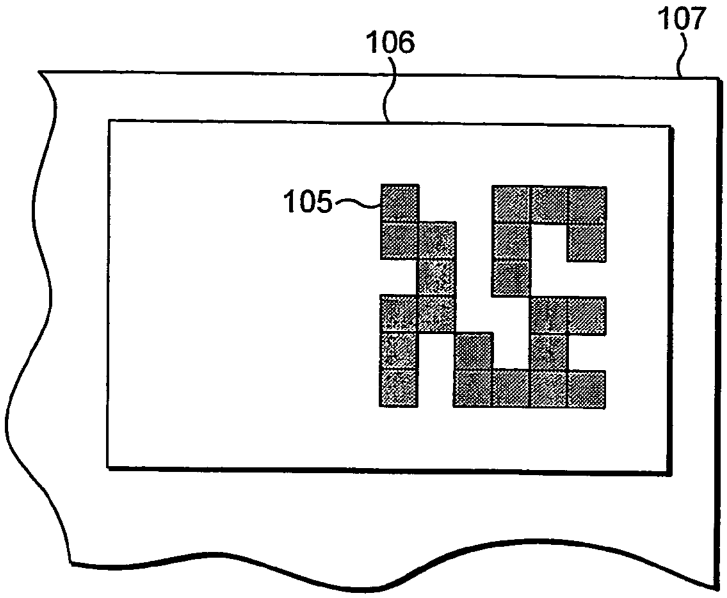
FIG. 5 illustrates an imprint as properly printed on an item in accordance with the second embodiment of the present invention.
Figure 6:
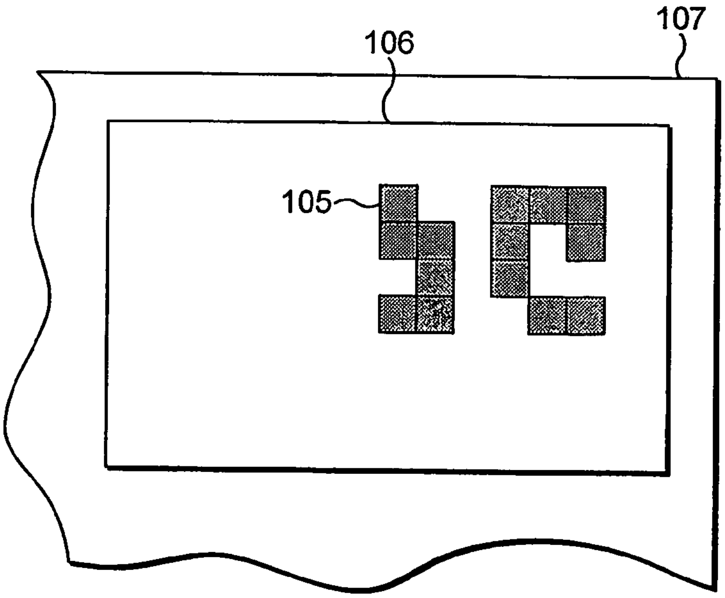
FIG. 6 illustrates an imprint as improperly printed on an item in accordance with the second embodiment of the present invention.

In this embodiment the validation unit 111 is operative to reference the position and shape of the footprint of the scanned imprint 105 to an expected position and shape. Where one or both of the position and shape of the imprint 105 is not as expected, the imprint 105, and hence the associated item 107, is assigned as being spoiled. In one embodiment the color of the imprint 105 could also be referenced. FIG. 5 illustrates a good imprint 105, in having a footprint which is of a predetermined size and located within a predetermined window on the label 106. FIG. 6 illustrates an example of a spoiled imprint 105, in having a footprint which is not of the expected size, in this example of a smaller size as caused by the printer 109 of the printing unit 103 not fully printing the imprint 105.

In this embodiment the validation unit 111 is operative to authenticate the obtained data by referencing the obtained data with the print data as utilized by the printing unit 103 to print the imprint 105. Where the obtained data and the print data do not reference, the imprint 105, and hence the associated item 107, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 101 further comprises a sorting unit 121 for removing the spoiled items 107 from the item stream, thereby providing for continued operation of the item handling system 101 without having to interrupt the item stream to retrieve the spoiled items 107. Following separation of the spoiled items 107, the labels 106 thereon are removed for presentation of the spoiled imprints 105 to the postage service for a refund in respect of the applied postage value.

This embodiment, by virtue of maintaining the spoiled items 107 intact, advantageously allows for the return of the spoiled items 107 to the item stream on re-application of labels 106.

In one embodiment the item handling system 101 can be configured such as to cease operation where a predetermined number of spoiled imprints 105 are printed for a given number of printed imprints 105. For example, where X spoiled imprints 105 are printed for Y printed imprints 105, or Z spoiled imprints 105 are printed consecutively.

Figure 7:
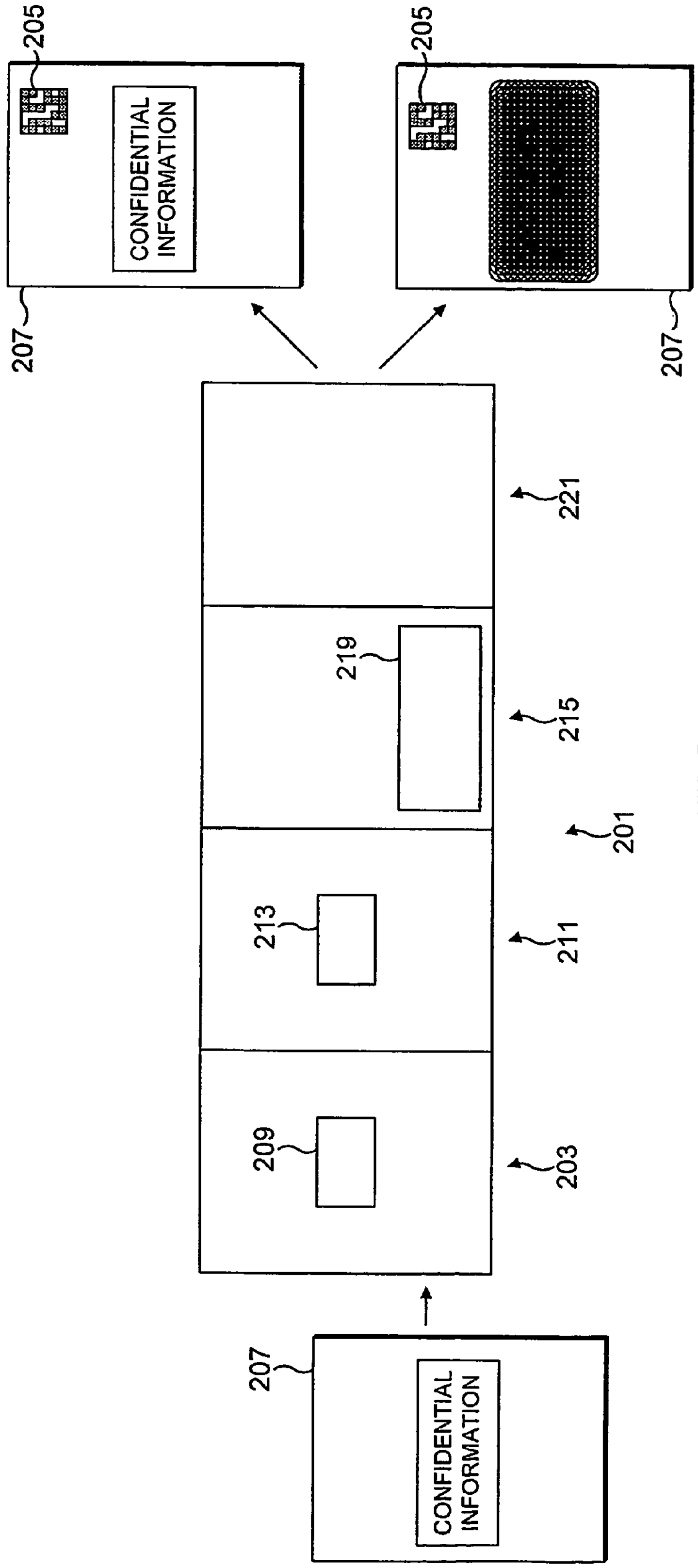
FIG. 7 illustrates an item handling system in accordance with a third embodiment of the present invention.

FIG. 7 illustrates an item handling system 201 in accordance with a third embodiment of the present invention.

The item handling system 201 comprises a printing unit 203 for printing a postage imprint 205 on each item 207 as delivered thereto. In this embodiment the item 207 comprises a mail document, such as one or more sheets, for example, letter or information sheets. In this embodiment the item 207 bears sensitive information, such as confidential, personal information.

The printing unit 203 includes a printer 209, in this embodiment having an addressable head, for printing a postage imprint 205, in this embodiment as a two-dimensional barcode indicium, alternatively referred to as a data matrix, embodying postage value on an item 207.

The item handling system 201 further comprises a validation unit 211 for validating the imprint 205 as applied to each item 207.

The validation unit 211 includes an imaging apparatus 213, in this embodiment utilizing a camera, for scanning each item 207 to determine the position and shape of the footprint of the applied imprint 205, and acquiring an image of the imprint 205 so as to read the data thereof.

Figure 8:
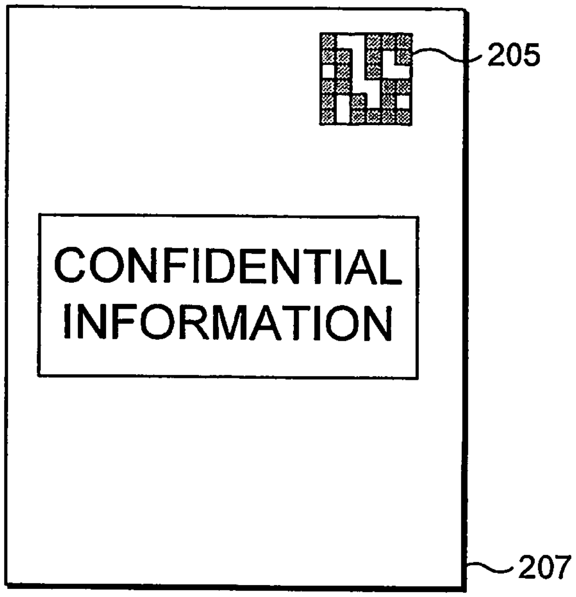
FIG. 8 illustrates an item having a properly-printed imprint thereon in accordance with the third embodiment of the present invention.
Figure 9:
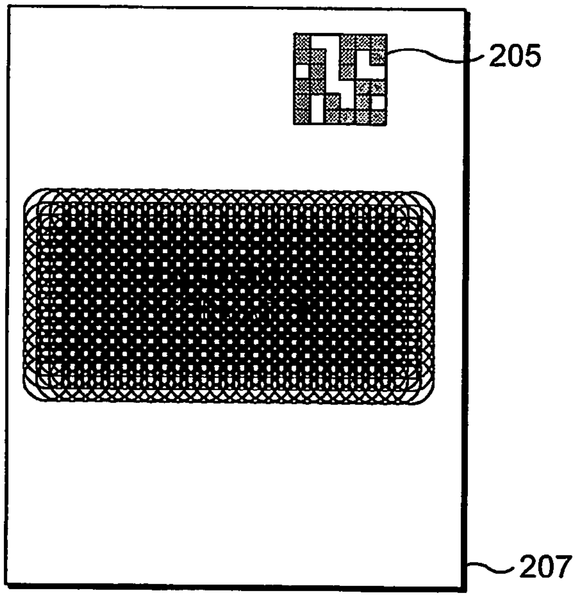
FIG. 9 illustrates an item having an improperly-printed imprint thereon in accordance with the third embodiment of the present invention.

In this embodiment the validation unit 211 is operative to reference the position and shape of the footprint of the scanned imprint 205 to an expected position and shape. Where one or both of the position and shape of the imprint 205 is not as expected, the imprint 205, and hence the associated item 207, is assigned as being spoiled. In one embodiment the color of the imprint 205 could also be referenced. FIG. 8 illustrates an item 207 bearing a good imprint 205, in having a footprint which is of a predetermined size and located within a predetermined window. FIG. 9 illustrates an item 207 bearing an example of a spoiled imprint 205, in having a footprint which extends outside a predetermined window, typically as caused by mis-registration of the item 207 and the printer 209 of the printing unit 203.

In this embodiment the validation unit 211 is operative to authenticate the obtained data by referencing the obtained data with the print data as utilized by the printing unit 203 to print the imprint 205. Where the obtained data and the print data do not reference, the imprint 205, and hence the associated item 207, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 201 further comprises an obliteration unit 215 for obliterating the sensitive information on each item 207 assigned as being spoiled, thereby allowing for the presentation of the spoiled items 207 to the postage service for a refund of the applied postage value without the sensitive information being made available to a third party.

In this embodiment the obliteration unit 215 includes a printer 219 for over-printing the sensitive information on the item 207. FIG. 9 illustrates an item 207 bearing an example of a spoiled imprint 205 where the sensitive information is over-printed such as to render the sensitive information unreadable.

The item handling system 201 further comprises a sorting unit 221 for removing the spoiled items 207 from the item stream, thereby providing for continued operation of the item handling system 201 without having to interrupt the item stream to retrieve the spoiled items 207.

In one embodiment the item handling system 201 can be configured such as to cease operation where a predetermined number of spoiled imprints 205 are printed for a given number of printed imprints 205. For example, where X spoiled imprints 205 are printed for Y printed imprints 205, or Z spoiled imprints 205 are printed consecutively.

Figure 10:
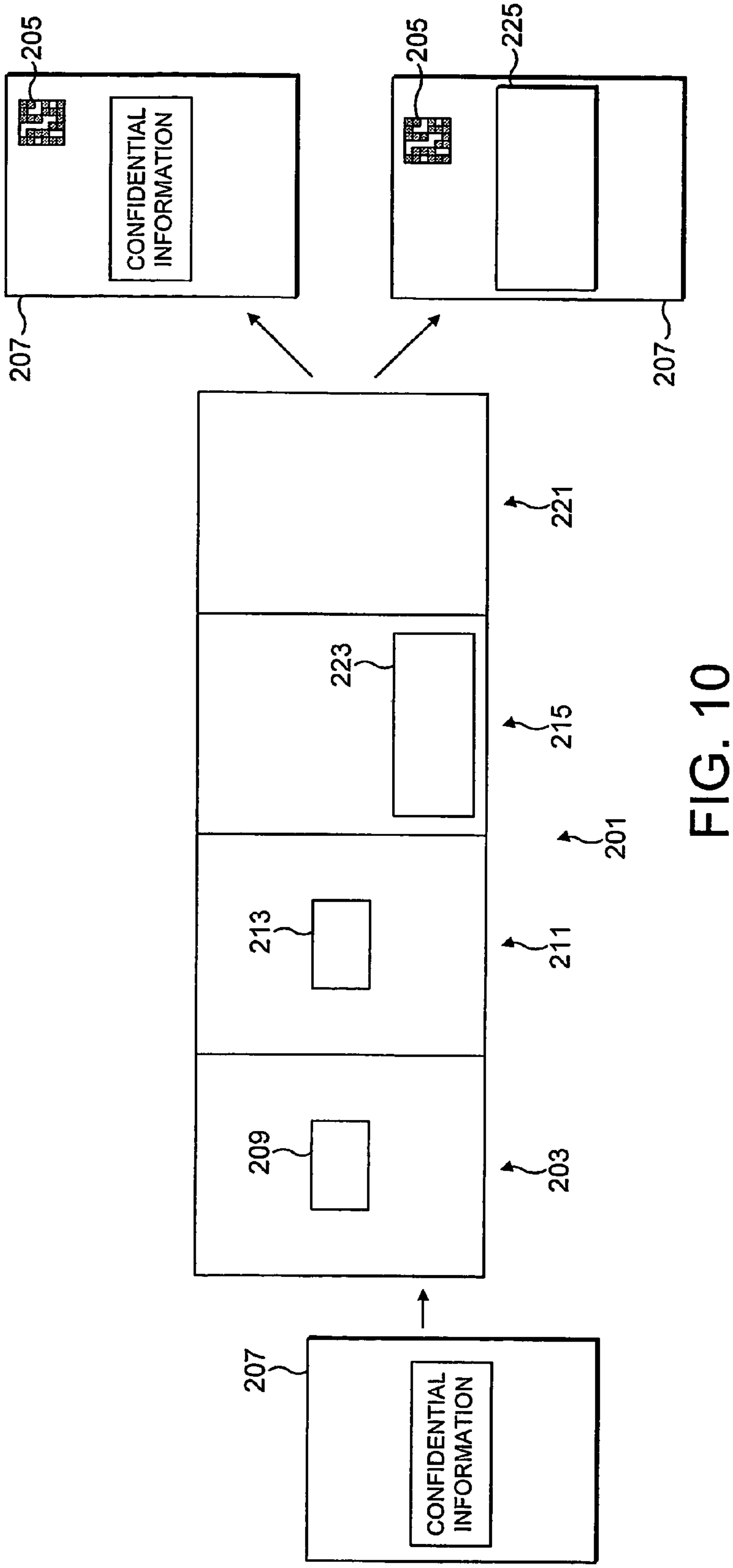
FIG. 10 illustrates an item handling system in accordance with a fourth embodiment of the present invention.

FIG. 10 illustrates an item handling system 201 in accordance with a fourth embodiment of the present invention.

The item handling system 201 of this embodiment is quite similar to that of the above-described third embodiment, and thus, in order to avoid unnecessary duplication of description, only the differences will be described in detail.

Figure 11:
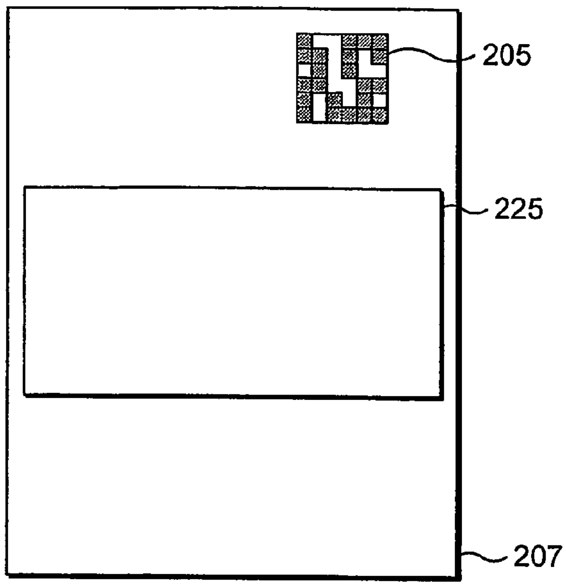
FIG. 11 illustrates an item having an improperly-printed imprint thereon in accordance with the fourth embodiment of the present invention.

The item handling system 201 of this embodiment differs from that of the above-described third embodiment in that the obliteration unit 215 includes, in place of the printer 219, an applicator 223 for permanently attaching a panel 225, typically an adhesive panel, over the sensitive information on each spoiled item 207. FIG. 11 illustrates an item 207 bearing an example of a spoiled imprint 205 where the sensitive information is overlaid with a panel 225 such as to render the sensitive information unreadable.

Figure 12:
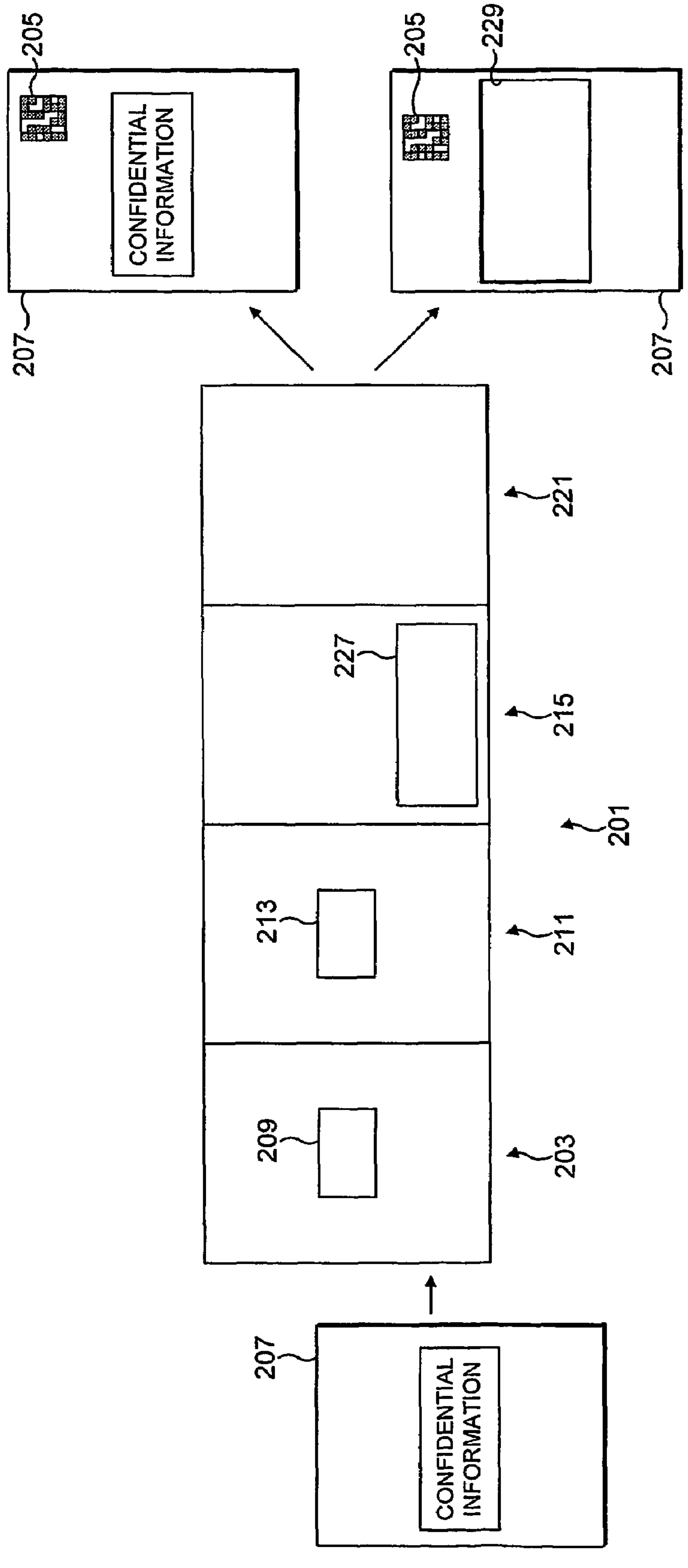
FIG. 12 illustrates an item handling system in accordance with a fifth embodiment of the present invention.

FIG. 12 illustrates an item handling system 201 in accordance with a fifth embodiment of the present invention.

The item handling system 201 of this embodiment is quite similar to that of the above-described third embodiment, and thus, in order to avoid unnecessary duplication of description, only the differences will be described in detail.

Figure 13:
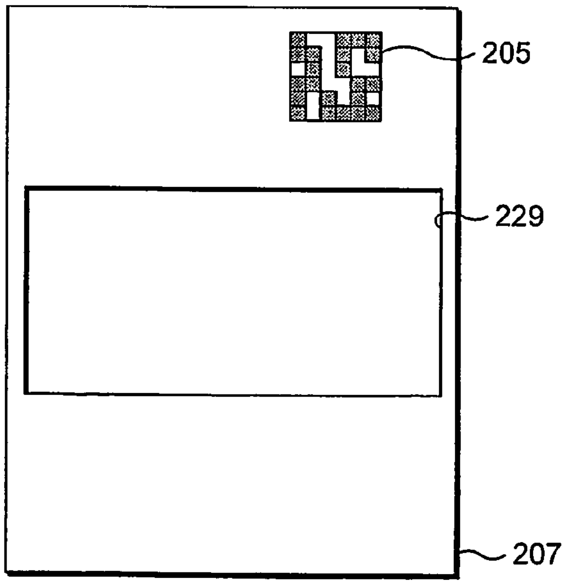
FIG. 13 illustrates an item having an improperly-printed imprint thereon in accordance with the fifth embodiment of the present invention.

The item handling system 201 of this embodiment differs from that of the above-described third embodiment in that the obliteration unit 215 includes, in place of the printer 219, a cutter 227 for cutting out a section 229 of the item 207 which encompasses the sensitive information. FIG. 13 illustrates an item 207 bearing an example of a spoiled imprint 205 where a section 229 of the item 207 corresponding to the sensitive information is cut out such as to allow the item 207 to be presented to the postage service in obtaining a refund of the applied postage value.

Figure 14:
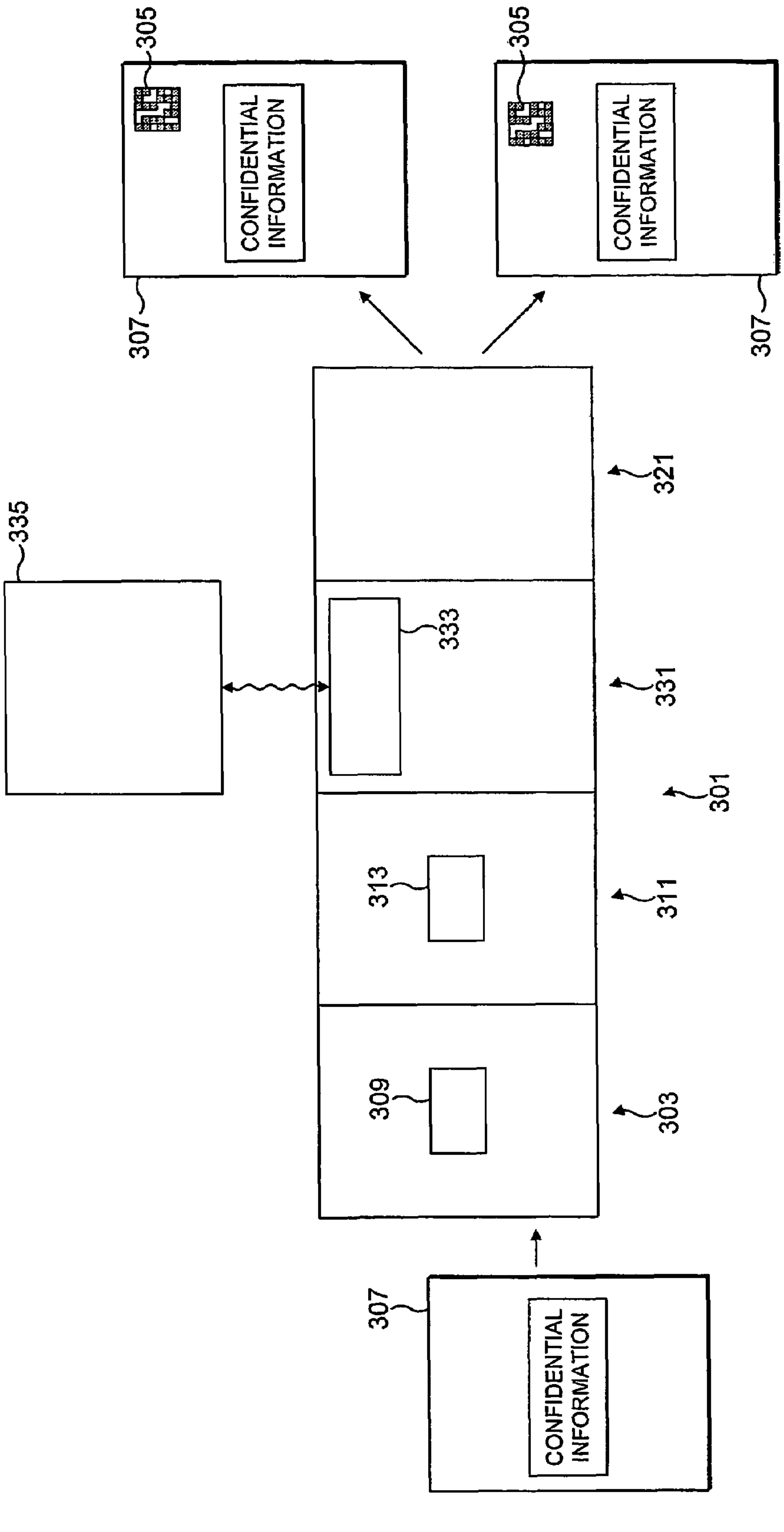
FIG. 14 illustrates an item handling system in accordance with a sixth embodiment of the present invention.

FIG. 14 illustrates an item handling system 301 in accordance with a sixth embodiment of the present invention.

The item handling system 301 comprises a printing unit 303 for printing a postage imprint 305 on each item 307 as delivered thereto. In this embodiment the item 307 comprises a mail document, such as one or more sheets, for example, letter or information sheets, but in other embodiments could be a mail carrier, such as an envelope. In this embodiment the item 307 bears sensitive information, such as confidential, personal information.

The printing unit 303 includes a printer 309, in this embodiment having an addressable head, for printing a postage imprint 305, in this embodiment as a two-dimensional barcode indicium, alternatively referred to as a data matrix, embodying postage value on an item 307.

The item handling system 301 further comprises a validation unit 311 for validating the imprint 305 as applied to each item 307.

The validation unit 311 includes an imaging apparatus 313, in this embodiment utilizing a camera, for scanning each item 307 to determine the position and shape of the footprint of the applied imprint 305, and acquiring an image of the imprint 305 so as to read the data thereof.

Figure 15:
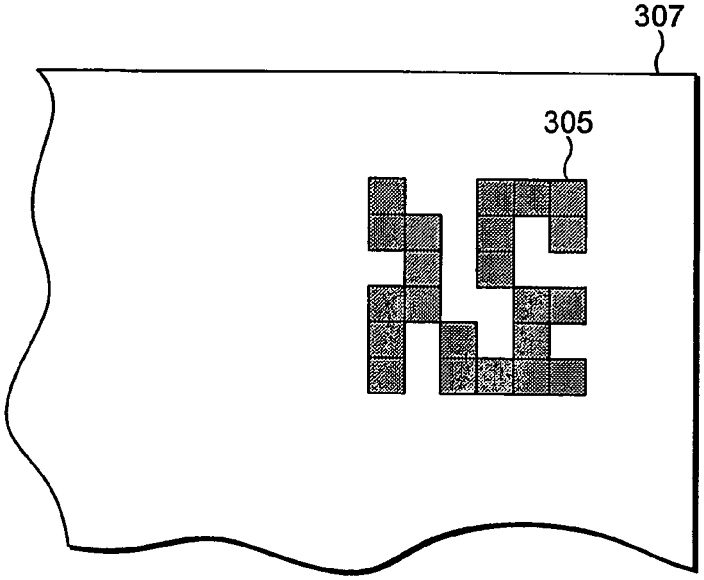
FIG. 15 illustrates an imprint as properly printed on an item in accordance with the sixth embodiment of the present invention.
Figure 16:
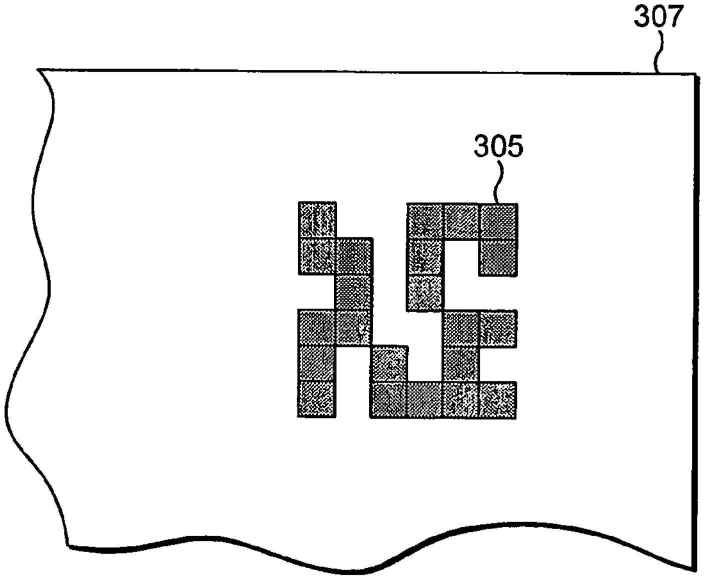
FIG. 16 illustrates an imprint as improperly printed on an item in accordance with the sixth embodiment of the present invention.

In this embodiment the validation unit 311 is operative to reference the position and shape of the footprint of the scanned imprint 305 to an expected position and shape. Where one or both of the position and shape of the imprint 305 is not as expected, the imprint 305, and hence the associated item 307, is assigned as being spoiled. In one embodiment the color of the imprint 305 could also be referenced. FIG. 15 illustrates a good imprint 305, in having a footprint which is of a predetermined size and located within a predetermined window. FIG. 16 illustrates an example of a spoiled imprint 305, in having a footprint which extends outside a predetermined window, typically as caused by mis-registration of the item 307 and the printer 309 of the printing unit 303.

In this embodiment the validation unit 311 is operative to authenticate the obtained data by referencing the obtained data with the print data as utilized by the printing unit 303 to print the imprint 305. Where the obtained data and the print data do not reference, the imprint 305, and hence the associated item 307, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 301 further comprises a sorting unit 321 for removing the spoiled items 307 from the item stream, thereby providing for continued operation of the item handling system 301 without having to interrupt the item stream to retrieve the spoiled items 307.

In one embodiment the item handling system 301 can be configured such as to cease operation where a predetermined number of spoiled imprints 305 are printed for a given number of printed imprints 305. For example, where X spoiled imprints 305 are printed for Y printed imprints 305, or Z spoiled imprints 305 are printed consecutively.

The item handling system 301 further comprises a control unit 331 which is operative to control the operation of the item handling system 301 and includes a communications module 333 for providing for communication with a remote station 335.

In this embodiment the control unit 331 is operative to transmit refund requests to the remote station 335 in respect of spoiled items 307, where each refund request includes an image of the respective spoiled imprint 305 so as to enable the postage service to authenticate spoilage. In one embodiment the control unit 331 is configured to transmit a refund request on detection of each spoiled item 307. In another embodiment the control unit 331 can be configured to transmit refund requests at predetermined intervals, for example, time intervals, such as daily or weekly, or event intervals, on re-crediting the item handling system 301.

In this embodiment the control unit 331 includes a refund credit register which stores the refunded value in respect of spoiled items 307 and maintains a history of the refunded value, and the remote station 335 is operative to credit the credit refund register with the postage value in respect of each authenticated refund request. In an alternative embodiment the remote station 335 can reconcile the postage value of authenticated refund requests at each re-crediting operation of the item handling system 301.

Figure 17:
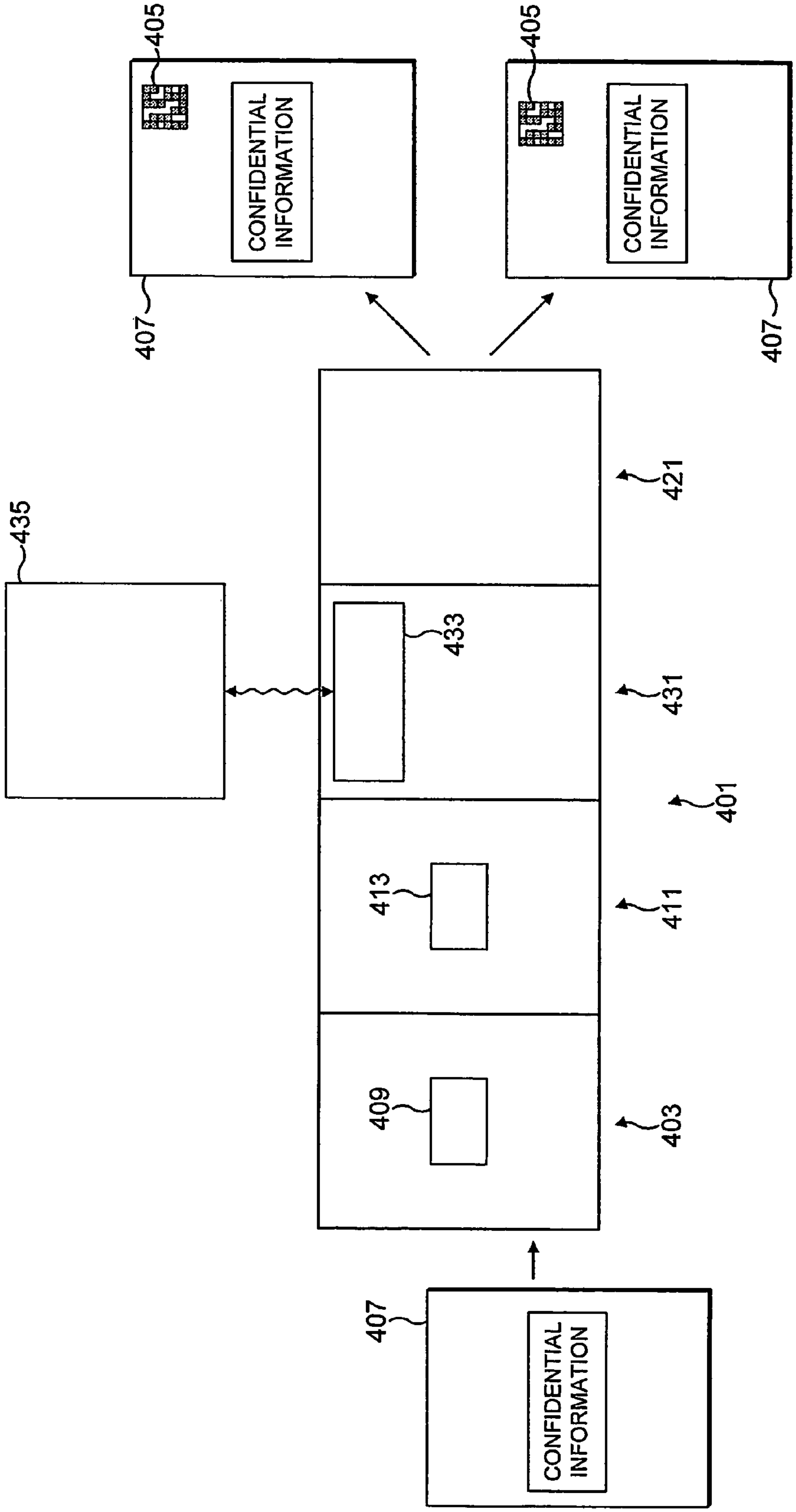
FIG. 17 illustrates an item handling system in accordance with a seventh embodiment of the present invention.

FIG. 17 illustrates an item handling system 401 in accordance with a seventh embodiment of the present invention.

The item handling system 401 comprises a printing unit 403 for printing a postage imprint 405 on each item 407 as delivered thereto. In this embodiment the item 407 comprises a mail document, such as one or more sheets, for example, letter or information sheets, but in other embodiments could be a mall carrier, such as an envelope. In this embodiment the item 407 bears sensitive information, such as confidential, personal information.

The printing unit 403 includes a printer 409, in this embodiment having an addressable head, for printing a postage imprint 405, in this embodiment as a two-dimensional barcode indicium, alternatively referred to as a data matrix, embodying postage value on an item 407.

The item handling system 401 further comprises a validation unit 411 for validating the imprint 405 as applied to each item 407.

The validation unit 411 includes an imaging apparatus 413, in this embodiment utilizing a camera, for scanning each item 407 to determine the position and shape of the footprint of the applied imprint 405, and acquiring an image of the imprint 405 so as to read the data thereof.

Figure 18:
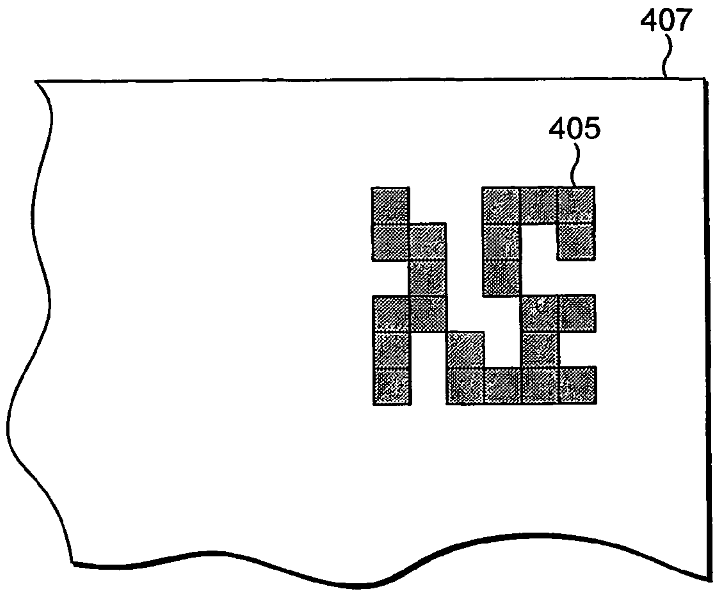
FIG. 18 illustrates an imprint as properly printed on an item in accordance with the seventh embodiment of the present invention.
Figure 19:
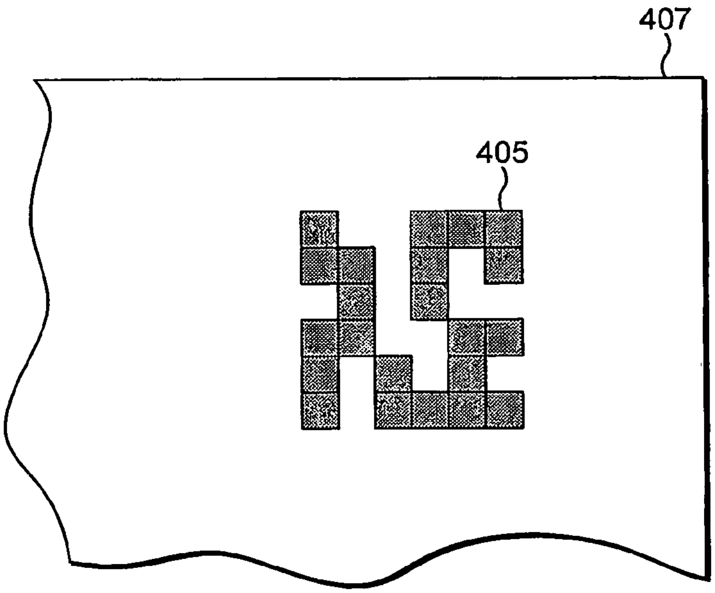
FIG. 19 illustrates an imprint as improperly printed on an item in accordance with the seventh embodiment of the present invention.

In this embodiment the validation unit 411 is operative to reference the position and shape of the footprint of the scanned imprint 405 to an expected position and shape. Where one or both of the position and shape of the imprint 405 is not as expected, the imprint 405, and hence the associated item 407, is assigned as being spoiled. In one embodiment the color of the imprint 405 could also be referenced. FIG. 18 illustrates a good imprint 405, in having a footprint which is of a predetermined size and located within a predetermined window. FIG. 19 illustrates an example of a spoiled imprint 405, in having a footprint which extends outside a predetermined window, typically as caused by mis-registration of the item 407 and the printing head 409 of the printing unit 403.

In this embodiment the validation unit 411 is operative to authenticate the obtained data by referencing the obtained data with the print data as utilized by the printing unit 403 to print the imprint 405. Where the obtained data and the print data do not reference, the imprint 405, and hence the associated item 407, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 401 further comprises a sorting unit 421 for removing the spoiled items 407 from the item stream, thereby providing for continued operation of the item handling system 401 without having to interrupt the item stream to retrieve the spoiled items 407.

In one embodiment the item handling system 401 can be configured such as to cease operation where a predetermined number of spoiled imprints 405 are printed for a given number of printed imprints 405. For example, where X spoiled imprints 405 are printed for Y printed imprints 405, or Z spoiled imprints 405 are printed consecutively.

The item handling system 401 further comprises a control unit 431 which is operative to control the operation of the item handling system 401 and includes a communications module 433 for providing for communication with a remote station 435.

In this embodiment the control unit 431 includes a spoiled items register which maintains a history of spoiled items 407 and a refund credit register which stores the refunded value in respect of spoiled items 407 and maintains a history of the refunded value, and is operative both to maintain the spoiled items register in respect of spoiled items 407, where each entry has an associated image of the respective spoiled imprint 405 so as to allow for future authentication by the postage service, and credit the refund credit register in respect of the postage value for each spoiled item 407. In one embodiment the credit in the refund credit register is credited to a main credit register from which postage value is debited at predetermined intervals.

In this embodiment the remote station 435 can communicate with the item handling system 401 through the communications module 433 thereof to audit the refund credit register so as to reconcile the refunded postage value against the credited postage value and the postage value of items 407 delivered to the postage service.

Figure 20:
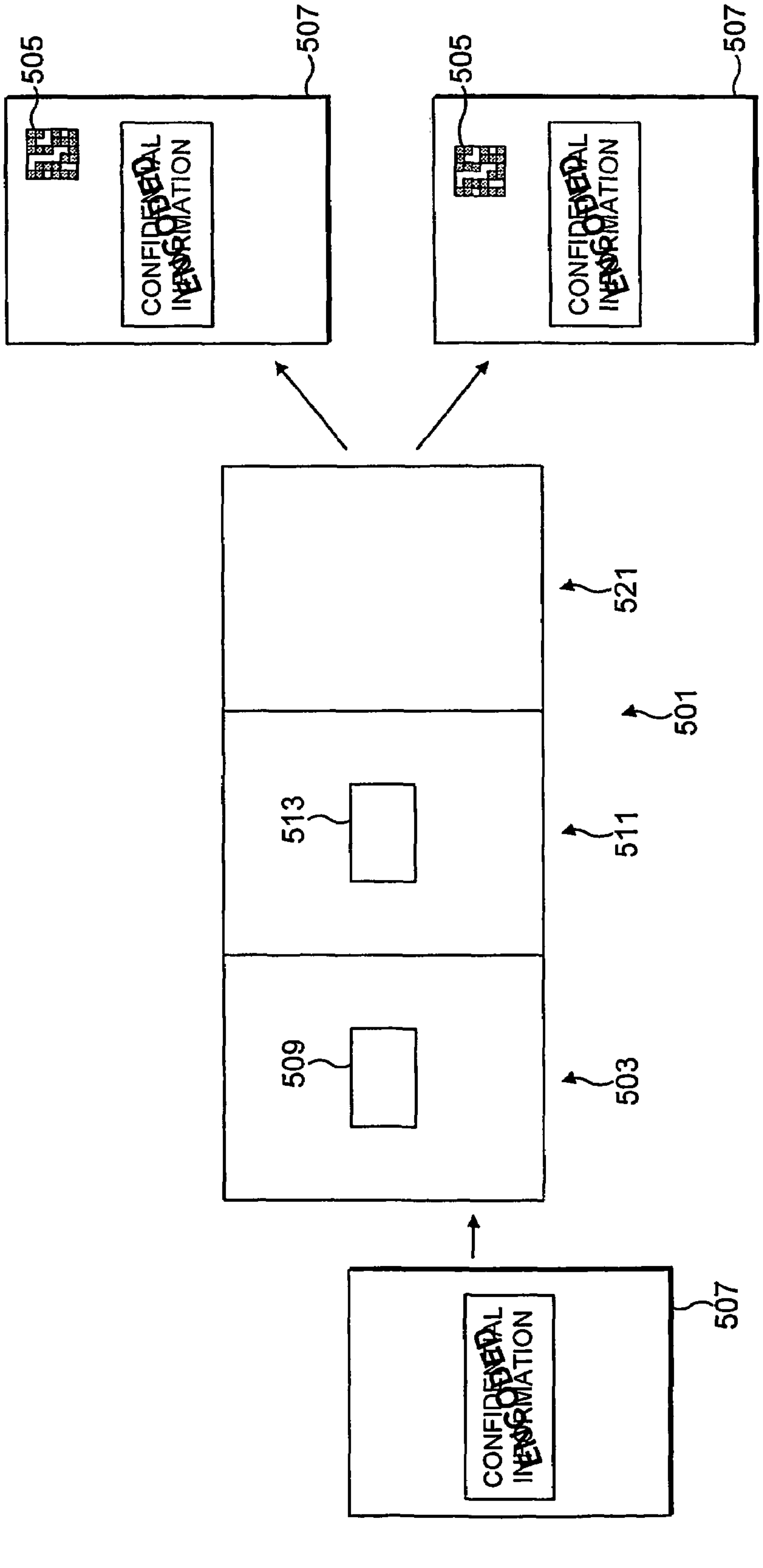
FIG. 20 illustrates an item handling system in accordance with an eighth embodiment of the present invention.

FIG. 20 illustrates an item handling system 501 in accordance with an eighth embodiment of the present invention.

The item handling system 501 comprises a printing unit 503 for printing a postage imprint 505 on each item 507 as delivered thereto. In this embodiment the item 507 comprises a mail document, such as one or more sheets, for example, letter or information sheets, but in other embodiments could be a mail carrier, such as an envelope. In this embodiment the item bears sensitive information, such as confidential, personal information.

In this embodiment the sensitive information is encoded, in preferred embodiments by digital signature or encryption. In being encoded, the sensitive information is not readable by other than the intended recipient who holds the required paired key, thus enabling the item 507 to be presented freely to the postage service without alteration.

The printing unit 503 includes a printer 509, in this embodiment having an addressable head, for printing a postage imprint 505, in this embodiment as a two-dimensional barcode indicium, alternatively referred to as a data matrix, embodying postage value on an item 507.

The item handling system 501 further comprises a validation unit 511 for validating the imprint 505 as applied to each item 507.

The validation unit 511 includes an imaging apparatus 513, in this embodiment utilizing a camera, for scanning each item 507 to determine the position and shape of the footprint of the applied imprint 505, and acquiring an image of the imprint 505 so as to read the data thereof.

Figure 21:
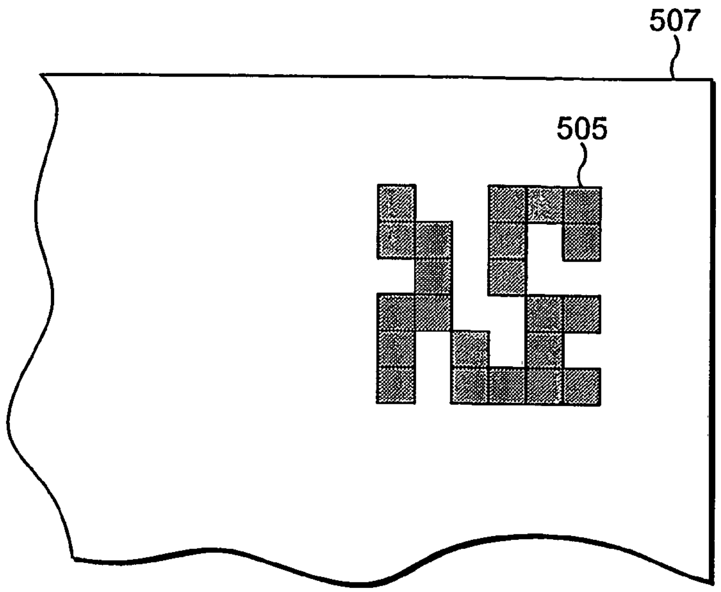
FIG. 21 illustrates an imprint as properly printed on an item in accordance with the eighth embodiment of the present invention.
Figure 22:
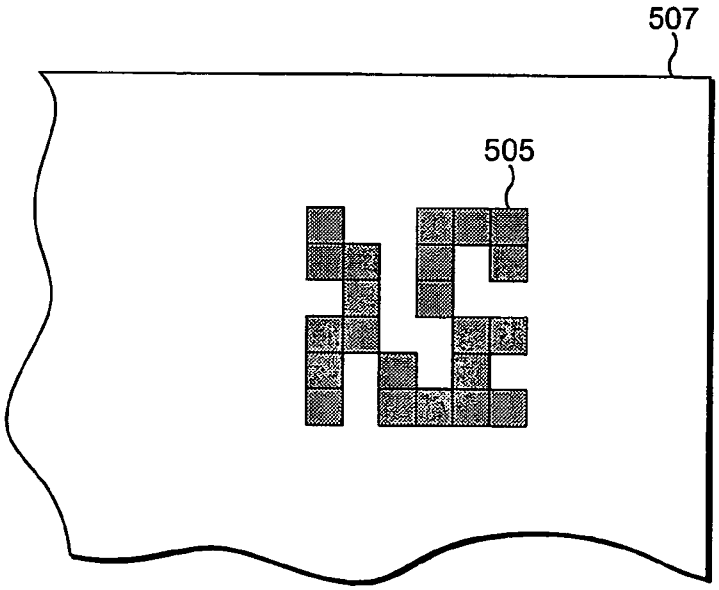
FIG. 22 illustrates an imprint as improperly printed on an item in accordance with the eighth embodiment of the present invention.

In this embodiment the validation unit 511 is operative to reference the position and shape of the footprint of the scanned imprint 505 to an expected position and shape. Where one or both of the position and shape of the imprint 505 is not as expected, the imprint 505, and hence the associated item 507, is assigned as being spoiled. In one embodiment the color of the imprint 505 could also be referenced. FIG. 21 illustrates a good imprint 505, in having a footprint which is of a predetermined size and located within a predetermined window. FIG. 22 illustrates an example of a spoiled imprint 505, in having a footprint which extends outside a predetermined window, typically as caused by mis-registration of the item 507 and the printing head 509 of the printing unit 503.

In this embodiment the validation unit 511 is operative to authenticate the obtained data by referencing the obtained data with the print data as utilized by the printing unit 503 to print the imprint 505. Where the obtained data and the print data do not reference, the imprint 505, and hence the associated item 507, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 501 further comprises a sorting unit 521 for removing the spoiled items 507 from the item stream, thereby providing for continued operation of the item handling system 501 without having to interrupt the item stream to retrieve the spoiled items 507.

In one embodiment the item handling system 501 can be configured such as to cease operation where a predetermined number of spoiled imprints 505 are printed for a given number of printed imprints 505. For example, where X spoiled imprints 505 are printed for Y printed imprints 505, or Z spoiled imprints 505 are printed consecutively.

Figure 23:
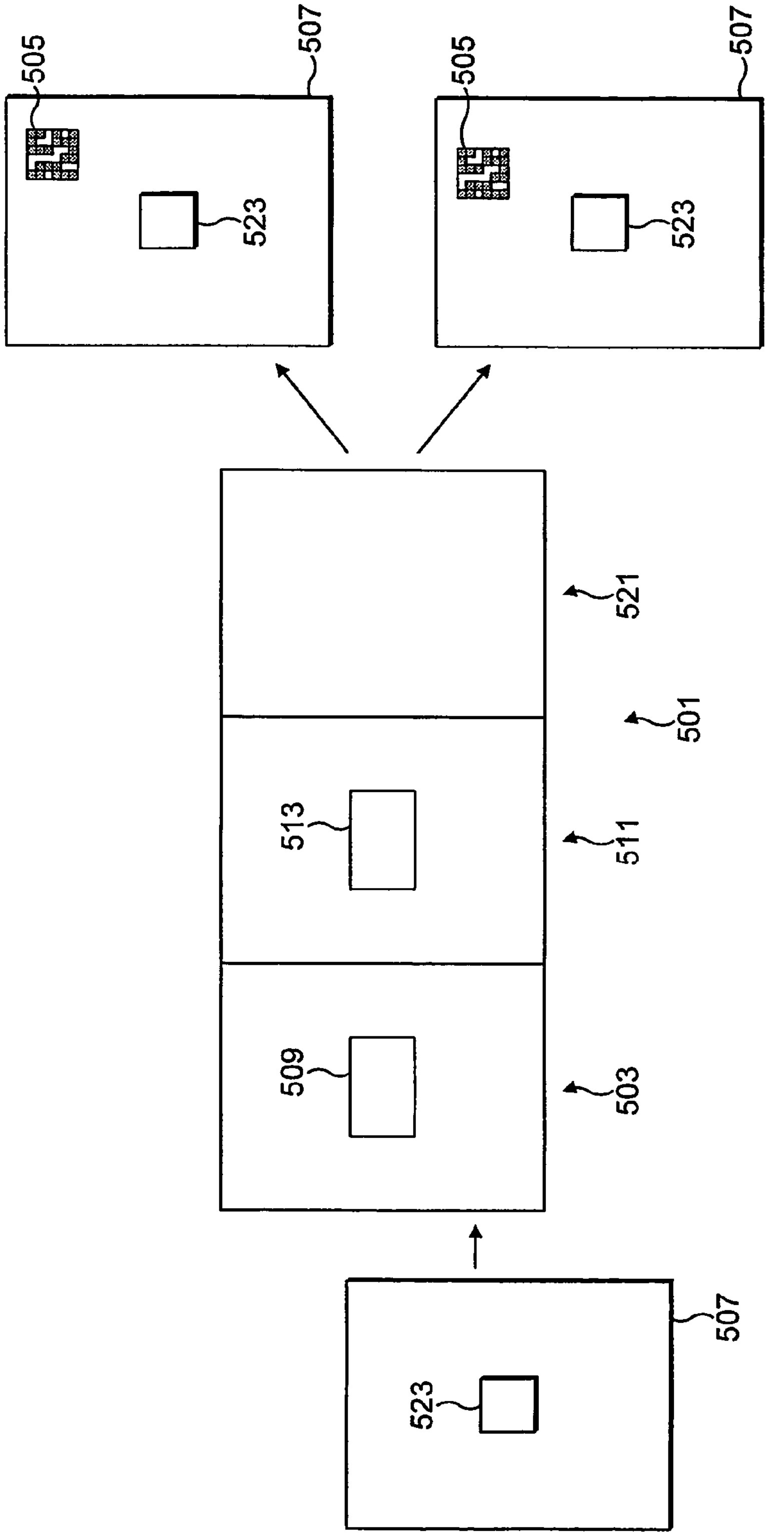
FIG. 23 illustrates an item handling system as a modification of the eighth embodiment of the present invention.

In one modification, as illustrated in FIG. 23, the item 507 includes an electronic information label 523, in this embodiment a radio frequency (RF) tag, in which the sensitive information is encoded.

Figure 24:
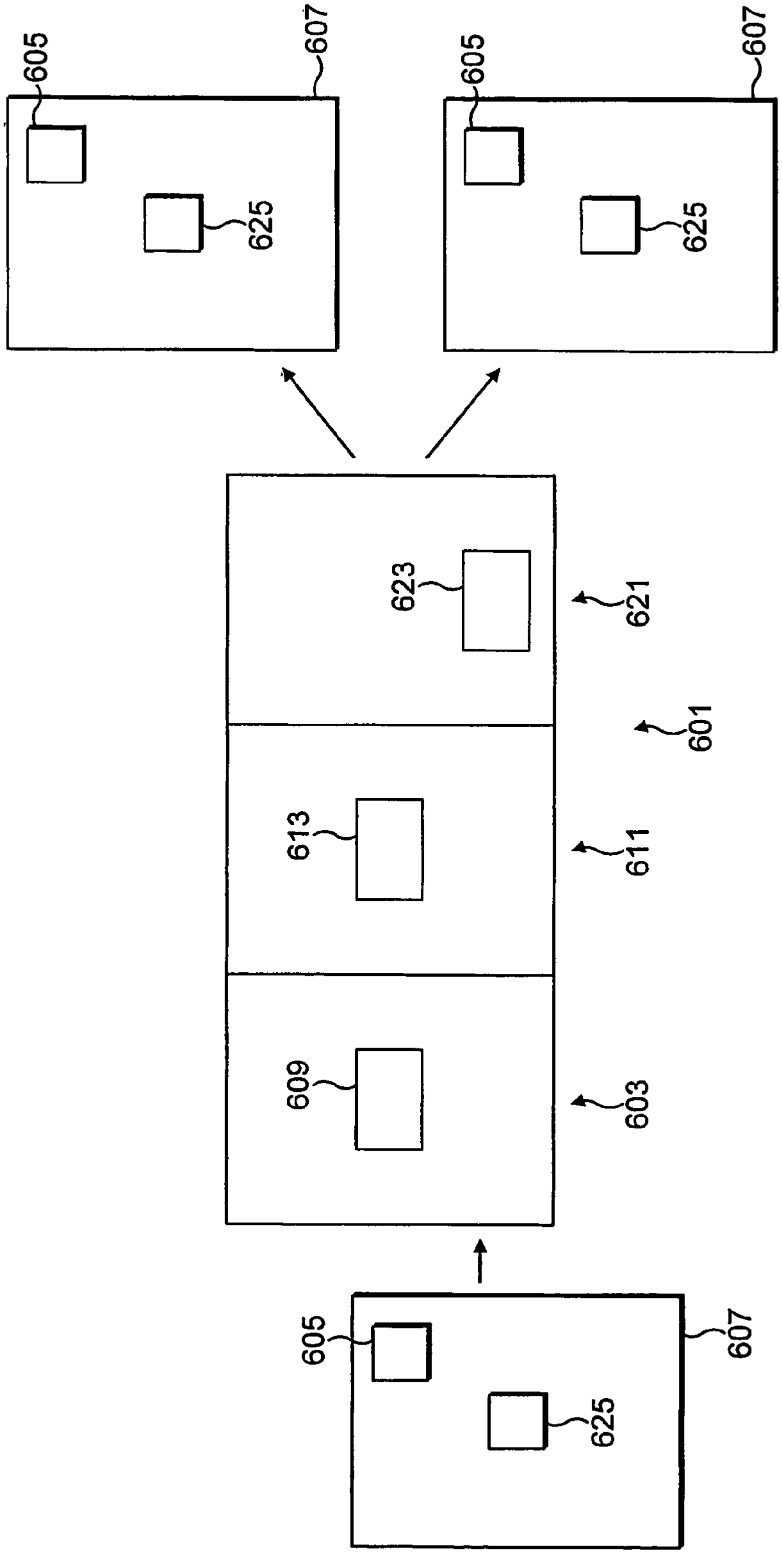
FIG. 24 illustrates an item handling system in accordance with a ninth embodiment of the present invention.

FIG. 24 illustrates an item handling system 601 in accordance with a ninth embodiment of the present invention.

The item handling system 601 comprises an authentication label writing unit 603 for writing an authentication code to an electronic authentication label 605, in this embodiment a radio frequency (RF) tag, on each item 607 as delivered thereto. In this embodiment the item 607 comprises a mail document, such as one or more sheets, for example, letter or information sheets. In this embodiment the item 607 bears sensitive information, such as confidential, personal information.

The label writing unit 603 includes an electronic label writer 609, in this embodiment a radio frequency (RF) writer, for writing an authentication code embodying postage value to an authentication label 605 on an item 607.

The item handling system 601 further comprises a validation unit 611 for validating the authentication code as written to the authentication label 605 on each item 607.

The validation unit 611 includes a label reader 613, in this embodiment a radio frequency (RF) reader, for reading the authentication label 605 such as to enable authentication of the authentication code.

In this embodiment the validation unit 611 is operative to authenticate the obtained data by referencing the obtained data with the write data as utilized by the label writing unit 603 in writing the authentication code to the authentication label 605. Where the obtained data and the write data do not reference, the authentication code, and hence the associated item 607, is assigned as being spoiled. In this embodiment the obtained data is referenced to the write data by a direct comparison of at least respective parts of the obtained data and the write data. In other embodiments the obtained data can be referenced to the write data by indirect comparison, through the use of representations of the respective data. In a further embodiment the obtained data could be authenticated by the format of the obtained data.

The item handling system 601 further comprises a sorting unit 621 for removing the spoiled items 607 from the item stream, thereby providing for continued operation of the item handling system 601 without having to interrupt the item stream to retrieve the spoiled items 607.

In this embodiment the sorting unit 621 includes an information label writing unit 623, in this embodiment a radio frequency (RF) writer, for over-writing an electronic information label 625, in this embodiment a radio frequency (RF) tag, which contains the sensitive information, on each spoiled item 607 such as to render the sensitive information unreadable.

In an alternative embodiment, where the electronic information labels 625 are re-writeable, spoilage information, which designates the reason for spoilage, such as through the use of an error code, can be written to the information label 625 of each spoiled item 607 by the information label writing unit 623. As will be appreciated, identifying the reason for spoilage facilitates the processing of spoiled items 607 by the postage service.

In one embodiment the item handling system 601 can be configured such as to cease operation where a predetermined number of spoiled items 607 are identified for a given number of items 607. For example, where X spoiled authentication labels 605 are identified for Y written labels 605, or Z spoiled labels 605 are written consecutively.

Figure 25:
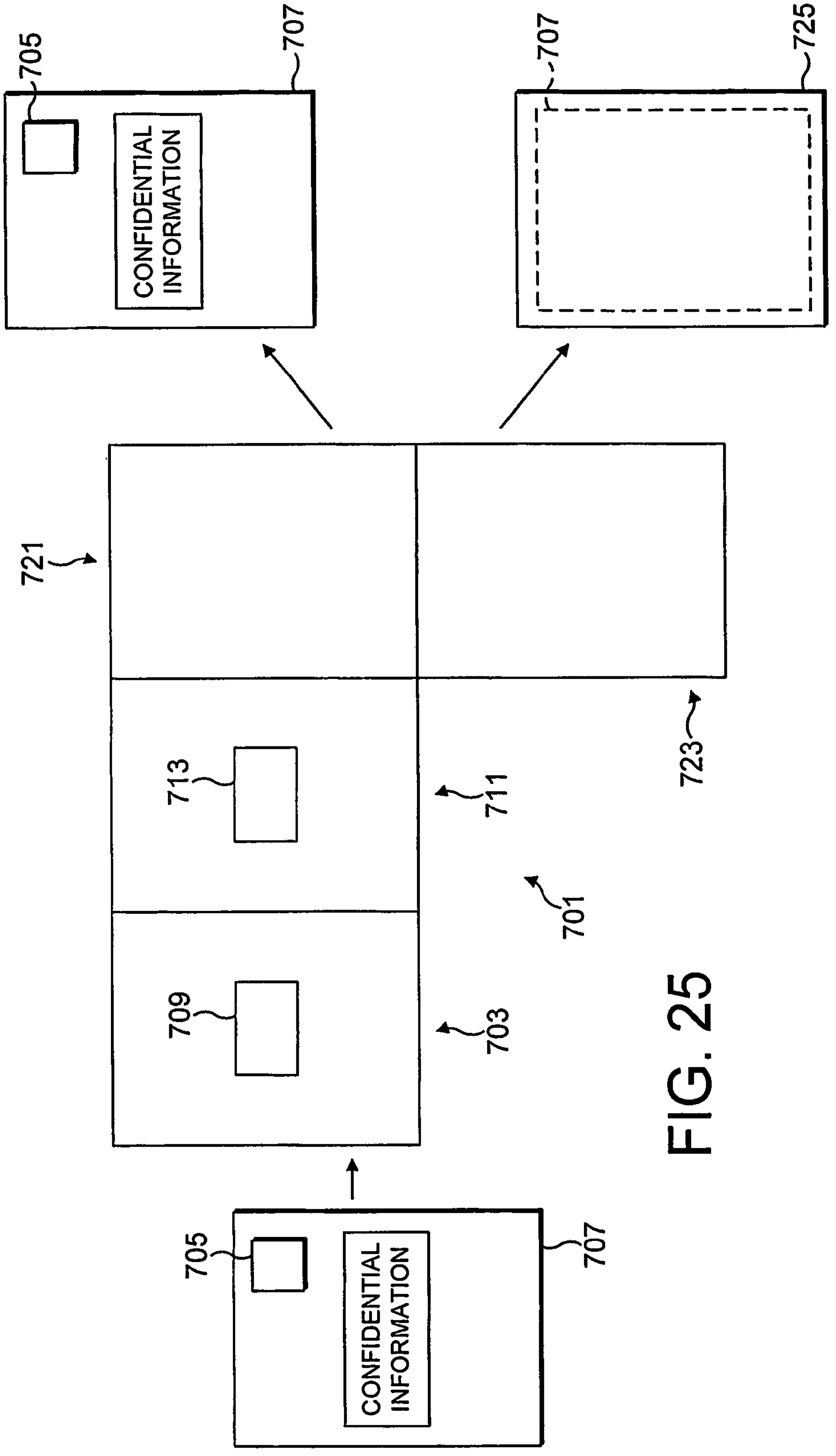
FIG. 25 illustrates an item handling system in accordance with a tenth embodiment of the present invention.

FIG. 25 illustrates an item handling system 701 in accordance with a tenth embodiment of the present invention.

The item handling system 701 comprises an electronic label writing unit 703 for writing an authentication code to an electronic authentication label 705, in this embodiment a radio frequency (RF) tag, on each item 707 as delivered thereto. In this embodiment the item 707 comprises a mail document, such as one or more sheets, for example, letter or information sheets, but in other embodiments could be a mail carrier, such as an envelope. In this embodiment the item 707 bears sensitive information, such as confidential, personal information.

The label writing unit 703 includes an electronic label writer 709, in this embodiment a radio frequency (RF) writer, for writing an authentication code embodying postage value to an authentication label 705 on an item 707.

The item handling system 701 further comprises a validation unit 711 for validating the authentication code as written to the authentication label 705 on each item 707.

The validation unit 711 includes a label reader 713, in this embodiment a radio frequency (RF) reader, for reading the authentication label 705 such as to enable authentication of the authentication code.

In this embodiment the validation unit 711 is operative to authenticate the obtained data by referencing the obtained data with the write data as utilized by the label writing unit 703 in writing the authentication code to the authentication label 705. Where the obtained data and the write data do not reference, the authentication code, and hence the associated item 707, is assigned as being spoiled. In this embodiment the obtained data is referenced to the write data by a direct comparison of at least respective parts of the obtained data and the write data. In other embodiments the obtained data can be referenced to the write data by indirect comparison, through the use of representations of the respective data. In a further embodiment the obtained data could be authenticated by the format of the obtained data.

The item handling system 701 further comprises a sorting unit 721 for removing the spoiled items 707 from the item stream, thereby providing for continued operation of the item handling system 701 without having to interrupt the item stream to retrieve the spoiled items 707.

The item handling system 701 further comprises a packaging unit 723 for enclosing each of the spoiled items 707 in an enclosed package 725. By enclosing the spoiled items 707, the sensitive information on the spoiled items 707 cannot be read by the postage service, but the authentication label 705 can still be read electronically.

In one embodiment the item handling system 701 can be configured such as to cease operation where a predetermined number of spoiled items 707 are identified for a given number of items 707. For example, where X spoiled authentication labels 705 are identified for Y written authentication labels 705, or Z spoiled authentication labels 705 are written consecutively.

Figure 26:
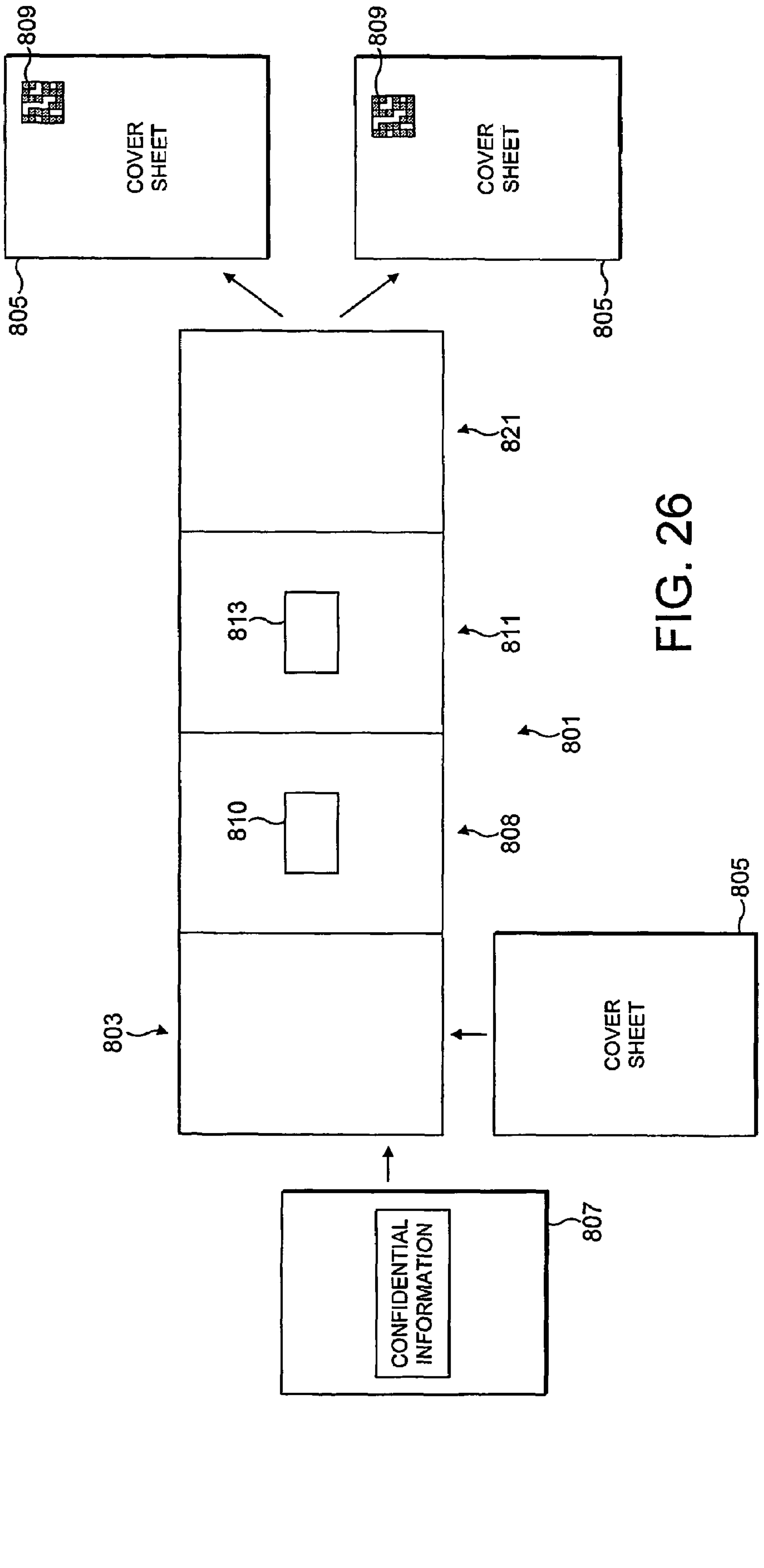
FIG. 26 illustrates an item handling system in accordance with an eleventh embodiment of the present invention.

FIG. 26 illustrates an item handling system 801 in accordance with an eleventh embodiment of the present invention.

The item handling system 801 comprises a cover sheet application unit 803 for applying a cover sheet 805 over each item 807 as delivered thereto. In this embodiment the item 807 comprises a mail document, such as one or more sheets, for example, letters or information sheets, but in other embodiments could be a mail carrier, such as an envelope. In this embodiment the item 807 bears sensitive information, such as confidential, personal information.

The item handling system 801 further comprises a printing unit 808 for printing a postage imprint 809 on each cover sheet 805 as delivered thereto.

The printing unit 808 includes a printer 810, in this embodiment having an addressable head, for printing a postage imprint 809, in this embodiment as a two-dimensional barcode indicium, alternatively referred to as a data matrix, embodying postage value on each cover sheet 805.

The item handling system 801 further comprises a validation unit 811 for validating the imprint 809 as applied to each cover sheet 805.

The validation unit 811 includes an imaging apparatus 813, in this embodiment utilizing a camera, for scanning each cover sheet 805 to determine the position and shape of the footprint of the applied imprint 809, and acquiring an image of the imprint 809 so as to read the data thereof.

Figure 27:
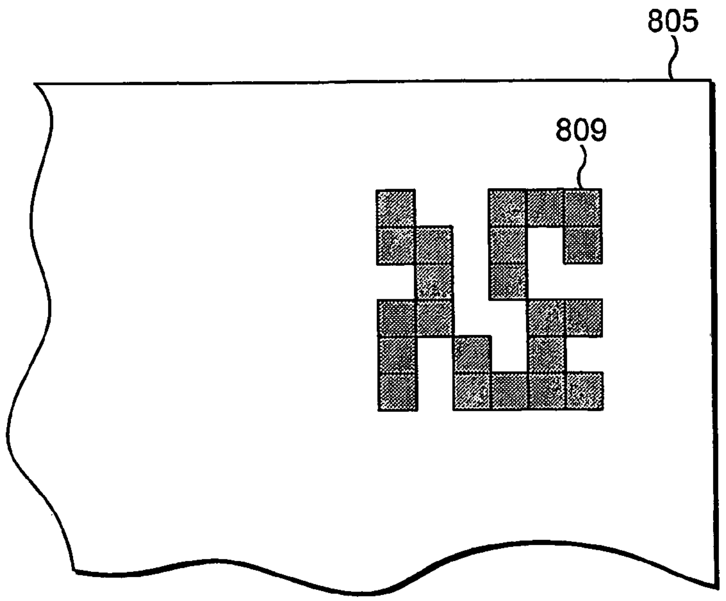
FIG. 27 illustrates an imprint as properly printed on an item in accordance with the eleventh embodiment of the present invention.
Figure 28:
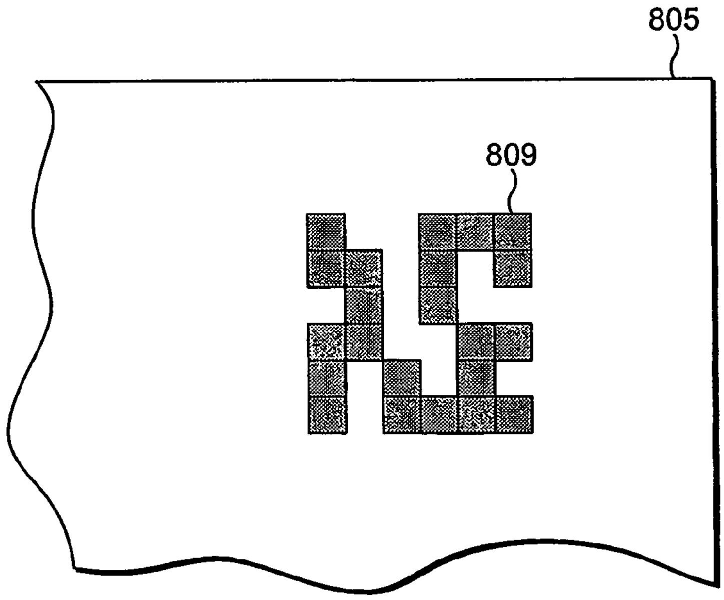
FIG. 28 illustrates an imprint as improperly printed on an item in accordance with the eleventh embodiment of the present invention.

In this embodiment the validation unit 811 is operative to reference the position and shape of the footprint of the scanned imprint 809 to an expected position and shape. Where one or both of the position and shape of the imprint 809 is not as expected, the imprint 809, and hence the associated item 807, is assigned as being spoiled. In one embodiment the color of the imprint 809 could also be referenced. FIG. 27 illustrates a good imprint 809, in having a footprint which is of a predetermined size and located within a predetermined window. FIG. 28 illustrates an example of a spoiled imprint 809, in having a footprint which extends outside a predetermined window, typically as caused by mis-registration of the cover sheet 805 and the printer 810 of the printing unit 808.

In this embodiment the validation unit 811 is operative to authenticate the obtained data by referencing the obtained data with the print data as utilized by the printing unit 808 to print the imprint 809. Where the obtained data and the print data do not reference, the imprint 809, and hence the associated item 807, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 801 further comprises a sorting unit 821 for removing the spoiled items 807 from the item stream, thereby providing for continued operation of the item handling system 801 without having to interrupt the item stream to retrieve the spoiled items 807. In this embodiment, by virtue of the imprints 809 being applied to cover sheets 805, the cover sheets 805 of the spoiled items 807 can be removed and the items 807 re-introduced into the mail stream. Also, as the cover sheets 805 include no sensitive information, the cover sheets 805 can be presented freely to the postage service without any alteration.

In one embodiment the item handling system 801 can be configured such as to cease operation where a predetermined number of spoiled imprints 809 are printed for a given number of printed imprints 809. For example, where X spoiled imprints 809 are printed for Y printed imprints 809, or Z spoiled imprints 809 are printed consecutively.

Figure 29:
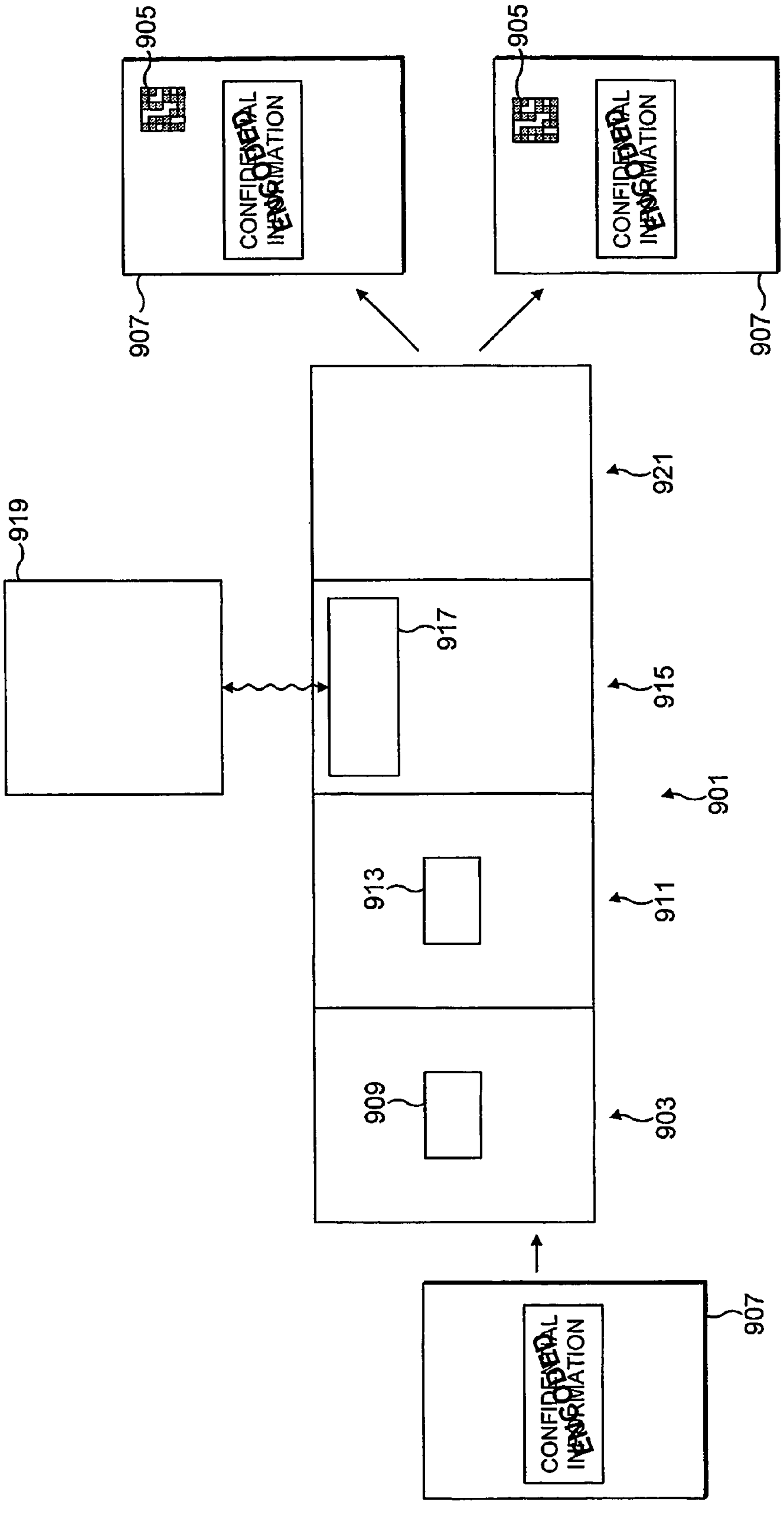
FIG. 29 illustrates an item handling system in accordance with a twelfth embodiment of the present invention.

FIG. 29 illustrates an item handling system 901 in accordance with a twelfth embodiment of the present invention.

The item handling system 901 comprises a printing unit 903 for printing a postage imprint 905 on an item 907 as delivered thereto. In this embodiment the item 907 comprises a mail document, such one or more sheets, for example, letter of information sheets, but in other embodiments could be a mail carrier, such as an envelope. In this embodiment the item 907 bears sensitive information, such as confidential, personal information.

In this embodiment the sensitive information is encoded, in preferred embodiments by digital signature or encryption. In being encoded, the sensitive information is not readable by other than the intended recipient who holds the required paired key, thus enabling the item 907 to be presented to the postage service without alteration.

The printing unit 903 includes a printer 909, in this embodiment having an addressable head, for printing a postage imprint 905, in this embodiment as a two-dimensional barcode indicium, alternatively referred to as a data matrix, embodying postage value on an item 907, in this embodiment a letter bearing confidential, personal information.

The item handling system 901 further comprises a validation unit 911 for validating the imprint 905 as applied to each item 907.

The validation unit 911 includes an imaging apparatus 913, in this embodiment utilizing a camera, for scanning each item 907 to determine the position and shape of the footprint of the applied imprint 905, and acquiring an image of the imprint 905 so as to read the data thereof.

Figure 30:
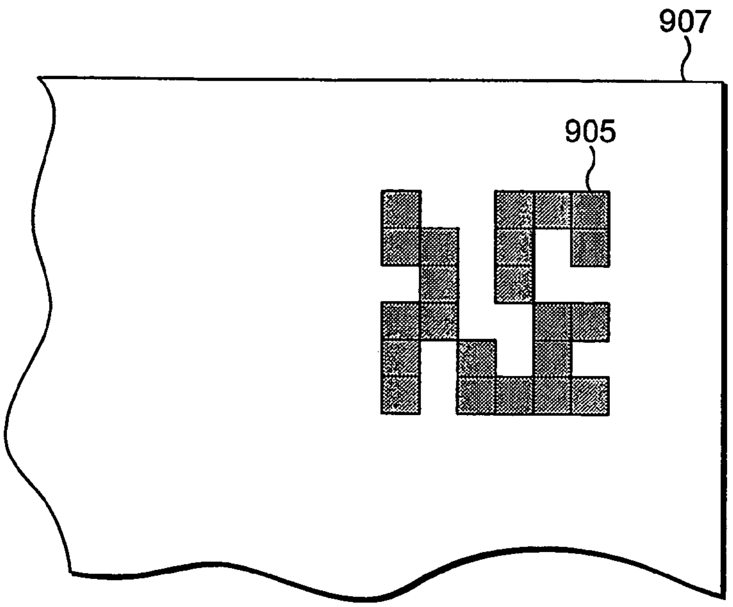
FIG. 30 illustrates an imprint as properly printed on an item in accordance with the twelfth embodiment of the present invention.
Figure 31:
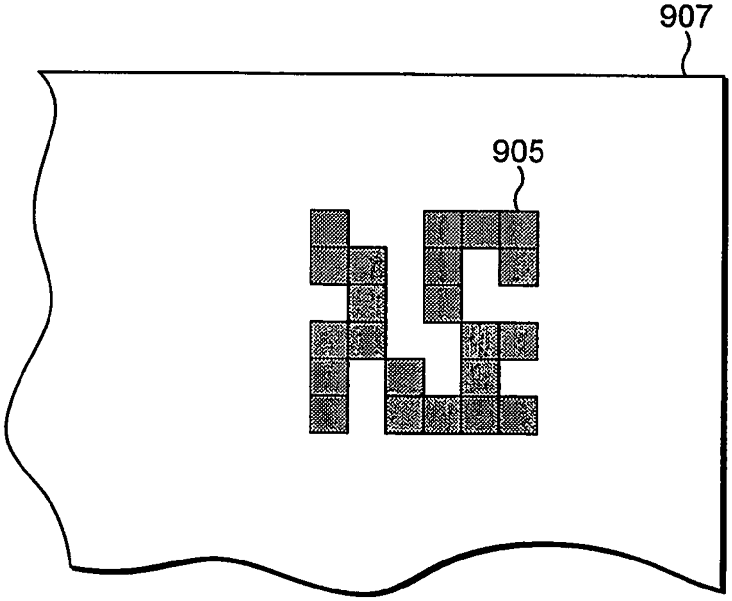
FIG. 31 illustrates an imprint as improperly printed on an item in accordance with the twelfth embodiment of the present invention.

In this embodiment the validation unit 911 is operative to reference the position and shape of the footprint of the scanned imprint 905 to an expected position and shape. Where one or both of the position and shape of the imprint 905 is not as expected, the imprint 905, and hence the associated item 907, is assigned as being spoiled. In one embodiment the color of the imprint 905 could also be referenced. FIG. 30 illustrates a good imprint 905, in having a footprint which is of a predetermined size and located within a predetermined window. FIG. 31 illustrates an example of a spoiled imprint 905, in having a footprint which extends outside a predetermined window, typically as caused by mis-registration of the item 907 and the printer 909 of the printing unit 903.

In this embodiment the validation unit 911 is operative to authenticate the obtained data by referencing the obtained data with the print data as utilized by the printing unit 903 to print the imprint 905. Where the obtained data and the print data do not reference, the imprint 905, and hence the associated item 907, is assigned as being spoiled. In this embodiment the obtained data is referenced to the print data by a direct comparison of at least respective parts of the obtained data and the print data. In other embodiments the obtained data can be referenced to the print data by indirect comparison, through the use of representations of the respective data. In a further embodiment the obtained data could be authenticated by the format of the obtained data.

The item handling system 901 further comprises a control unit 915 which is operative to control the operation of the item handling system 901.

In this embodiment the control unit 915 is operative, on assignment of an item 907 as being spoiled, to control the printing unit 903 to reuse the authentication code of the spoiled imprint 905 on a subsequent item 907 as delivered thereto. Through such reuse of the authentication code of each spoiled imprint 905, a refund of the applied postage value is not required. In this embodiment the control unit 915 is operative to effect reuse of the authentication code from a spoiled item 907 automatically, thereby avoiding any possibility of fraudulent intervention by an operator.

In this embodiment the control unit 915 maintains a spoiled items register in respect of spoiled items 907, where each entry includes an image for the respective spoiled imprint 905.

In this embodiment the control unit 915 includes a communications module 917 for providing for communication with a remote station 919. In this embodiment the remote station 919 can communicate with the item handling system 901 through the communications module 917 thereof to audit the spoiled items register so as to enable reconciliation of the spoiled items register and the spoiled items 907 as returned to the postage service.

The item handling system 901 further comprises a sorting unit 921 for removing the spoiled items 907 from the item stream, thereby providing for continued operation of the item handling system 901 without having to interrupt the item stream to retrieve the spoiled items 907.

In one embodiment the item handling system 901 can be configured such as to cease operation where a predetermined number of spoiled imprints 905 are printed for a given number of printed imprints 905. For example, where X spoiled imprints 905 are printed for Y printed imprints 905, or Z spoiled imprints 905 are printed consecutively.

Finally, it will be understood that the present invention has been described in its preferred embodiments and can be modified in many different ways without departing from the scope of the invention as defined by the appended claims.

For example, the item handling system 901 of the twelfth-described embodiment can be modified in the manner of the item handling systems 1, 101, 201, 301, 401, 501, 601, 701, 801 of the other-described embodiments.

In another example, the item handling system 701 of the tenth-described embodiment can be modified in the manner of the item handling systems 1, 101, 201, 301, 401, 501, 601, 801, 901 of the other-described embodiments to provide for concealment of the sensitive information where that information would otherwise be readable.

The invention claimed is:

1. A computer-implemented method of refunding value applied to a spoiled mail item bearing sensitive information, comprising the steps of:

validating, by a validation unit, a postage imprint associated with a mail item in a mail item stream, the mail item bearing sensitive information, wherein the postage imprint does not satisfy at least one validation criterion;

assigning the mail item as being a spoiled mail item;

separating the spoiled mail item from the mail item stream;

presenting at least one of the spoiled mail item and the associated postage imprint to a postage service, so that the sensitive information is not readable by the postage service; and refunding the value applied to the spoiled mail item based on a determination by the postage service, the determination based at least in part on the postage imprint.

2. The method of claim 1, wherein the step of validating the postage imprint further comprises scanning the mail item for the postage imprint.

3. The method of claim 2, wherein the at least one validation criterion requires the postage imprint to have at least one physical characteristic, comprising at least one of a position, size, and color of the postage imprint.

4. The method of claim 1, wherein the validation step comprises reading data from the postage imprint.

5. The method of claim 4, wherein the at least one validation criterion requires authentication of at least part of the data read from the postage imprint.

6. The method of claim 5, wherein the authentication of at least part of the read data requires the at least part of the read data to have a predeterminable format.

7. The method of claim 5, wherein the authentication of at least part of the read data requires the at least part of the read data to match check data.

8. The method of claim 1, wherein the postage imprint is a printed imprint.

9. The method of claim 1, wherein the postage imprint is an electronic label.

10. The method of claim 1, further comprising separating a section of the postage imprint, the separated section including an authentication code and excluding the sensitive information, to allow the separated section to be presented to the postage service with the sensitive information not being readable by the postage service.

11. The method of claim 1, wherein the spoiled mail item includes a label on which the postage imprint is provided, and further comprising the step of:

separating the label from the spoiled mail item to allow the label to be presented to a third party, with the sensitive information not being readable by the third party.

12. The method of claim 1, further comprising the step of:

obliterating the sensitive information on the spoiled mail item to cause the sensitive information to be unreadable by the postage service.

13. The method of claim 12 wherein the obliterating step comprises the step of:

over-printing the sensitive information to render the sensitive information unreadable.

14. The method of claim 12 wherein the obliterating step comprises the step of:

applying a panel over the sensitive information to render the sensitive information unreadable.

15. The method of claim 12, wherein the obliterating step comprises the step of:

cutting out a section of the spoiled mail item including the sensitive information.

16. The method of claim 1, further comprising the step of:

packaging the spoiled mail item to conceal the sensitive information and allow the spoiled mail item to be presented to the postage service, with the sensitive information not being readable by the postage service.

17. The method of claim 1, wherein the spoiled mail item includes a cover sheet which includes no sensitive information and on which the postage imprint is provided, and further comprising the step of:

separating the cover sheet from the spoiled mail item to allow the cover sheet to be presented to the postage service, with the sensitive information not being readable by the postage service.

18. The method of claim 1, further comprising the step of:

generating a spoiled item notification for the spoiled mail item for communication to a remote center.

19. The method of claim 18, further comprising the step of:

electronically transmitting the spoiled item notification to the remote center, wherein each spoiled item notification transmitted to the remote center is transmitted separately or multiple spoiled item notifications are transmitted in batches at predeterminable intervals.

20. The method of claim 18, wherein an image of the postage imprint associated with the spoiled mail item is acquired in the validation step, and each spoiled item notification includes the image which excludes the sensitive information to allow the image to be presented to the postage service, with the sensitive information not being readable by the postage service.

21. The method of claim 1, further comprising the step of:

crediting a refund credit register for the value applied to each postage imprint for each spoiled item.

22. The method of claim 1, further comprising the step of:

writing a postage imprint for a subsequent mail item in the mail item stream, wherein the written postage imprint contains an authentication code contained in the postage imprint of the spoiled mail item.

23. The method of claim 22, wherein the postage imprint is an electronic label and the writing step comprises the step of:

electronically writing to an electronic label on the subsequent mail item.

24. The method of claim 1, wherein the mail item comprises documents, the documents comprising one or more sheets.

25. The method of claim 1, wherein the mail item comprises at least one of document carriers, envelopes and mail carriers.

26. The method of claim 1, wherein the sensitive information is encoded separately from the postage imprint.

27. A mail handling system for refunding value applied to a spoiled mail item bearing sensitive information, comprising:

a validation unit for validating a postage imprint associated with a mail item in a mail item stream, the mail item bearing sensitive information, and for assigning the mail item as being spoiled where the postage imprint associated with the mail item does not satisfy at least one validation criterion;

a sorting unit for separating the spoiled mail item from the mail item stream, with the postage imprint of the spoiled mail item being presented for authentication by a postage service, so that the sensitive information is not readable by the postage service; and a control unit for controlling operation of the system, wherein the control unit includes a refund credit register and is operative to credit the refund credit register with the value applied to the spoiled mail item, the spoiled mail item being authenticated by the postage service based at least in part on the postage imprint.

28. The system of claim 27, wherein the validation unit is operative to scan the mail item for the postage imprint.

29. The system of claim 28, wherein the at least one validation criterion requires the postage imprint to have at least one physical characteristic comprising at least one of a position, size and color of the postage imprint.

30. The system of claim 27, wherein the validation unit is operative to read data from the postage imprint.

31. The system of claim 30, wherein the at least one validation criterion requires authentication of at least part of the data read from the postage imprint.

32. The system of claim 31, wherein the authentication of at least part of the read data requires the at least part of the read data to have a predeterminable format.

33. The system of claim 31, wherein the authentication of at least part of the read data requires the at least part of the read data to match check data.

34. The system of claim 27, wherein the postage imprint is a printed two-dimensional barcode.

35. The system of claim 27, wherein the postage imprint is a radio frequency tag.

36. The system of claim 27, wherein the mail item includes an electronic label containing the sensitive information.

37. The system of claim 27, wherein the postage imprint is removable from the mail item to allow the postage imprint to be separated and presented to the postage service, with the sensitive information not being readable by the postage service.

38. The system of claim 27, wherein each mail item includes a label on which the postage imprint is provided to allow the postage imprint to be separated by removal of the label, and thereby allow the label to be presented to the postage service, with the sensitive information not being readable by the postage service.

39. The system of claim 27, further comprising:

an obliteration unit for obliterating the sensitive information on the spoiled mail item to allow the spoiled mail item to be presented to the postage service, with the sensitive information not being readable by the postage service.

40. The system of claim 39, wherein the obliteration unit comprises a printer for over-printing the sensitive information to render the sensitive information unreadable.

41. The system of claim 39, wherein the obliteration unit comprises an applicator for applying a panel over the sensitive information to render the sensitive information unreadable.

42. The system of claim 39, wherein the obliteration unit comprises a cutter for cutting out a section of the spoiled mail item including the sensitive information, so the spoiled mail item includes no sensitive information.

43. The system of claim 27, further comprising:

a packaging unit for packaging the spoiled mail item to conceal the sensitive information, and thereby allow the spoiled mail item to be presented to the postage service, with the sensitive information not being readable by the postage service.

44. The system of claim 27, wherein the mail item includes a cover sheet which includes no sensitive information and on which the postage imprint is provided to allow the cover sheet to be separated from the mail item and presented to the postage service, with the sensitive information not being readable by the postage service.

45. The system of claim 27, wherein the control unit is operative to generate a spoiled mail item notification for the spoiled mail item for communication to a remote center.

46. The system of claim 45, wherein the control unit includes a communications module for electronically communicating with the remote center, whereby spoiled item notifications generated by the control unit are transmitted electronically to the remote center, and each spoiled item notification is transmitted separately or spoiled item notifications are transmitted in batches at predeterminable intervals.

47. The system of claim 45, wherein the validation unit is operative to acquire an image of the postage imprint associated with the spoiled mail item, and the spoiled item notification includes the image which excludes the sensitive information to allow the image to be presented to the postage service, with the sensitive information not being readable by the postage service.

48. The system of claim 27, further comprising a writing unit for writing the postage imprint, wherein the control unit is operative to control the writing unit to write the postage imprint comprising an authentication code contained in the postage imprint associated with a previous mail item assigned as being spoiled.

49. The system of claim 48, wherein the postage imprint a two dimensional barcode, and the writing unit comprises a printing unit.

50. The system of claim 48, wherein the postage imprint is an electronic label, and the writing unit comprises an electronic label writer.

51. The system of claim 27, wherein the mail item comprises documents including one or more sheets.

52. The system of claim 27, wherein the mail item comprises at least one of document carriers, envelopes and mail carriers.

53. The system of claim 27, wherein the sensitive information is encoded separately from the postage imprint.

* * * * *